(12) United States Patent
Sipple

(10) Patent No.: US 9,609,010 B2
(45) Date of Patent: Mar. 28, 2017

(54) SYSTEM AND METHOD FOR DETECTING INSIDER THREATS

(71) Applicant: PERSONAM, INC., McLean, VA (US)

(72) Inventor: John A. Sipple, Germantown, MD (US)

(73) Assignee: PERSONAM, INC., McLean, VA (US)

(*) Notice: Subject to any disclaimer, the term of this patent is extended or adjusted under 35 U.S.C. 154(b) by 0 days.

(21) Appl. No.: 14/498,776

(22) Filed: Sep. 26, 2014

(65) Prior Publication Data
US 2015/0101053 A1   Apr. 9, 2015

Related U.S. Application Data

(60) Provisional application No. 61/887,143, filed on Oct. 4, 2013.

(51) Int. Cl.
G06F 11/00 (2006.01)
H04L 29/06 (2006.01)

(52) U.S. Cl.
CPC .................. H04L 63/1425 (2013.01)

(58) Field of Classification Search
CPC .................................... H04L 63/1425
USPC ........................................................... 726/24
See application file for complete search history.

(56) References Cited

U.S. PATENT DOCUMENTS

| | | | | |
|---|---|---|---|---|
| 6,658,095 | B1* | 12/2003 | Yoakum | H04L 12/66 379/106.01 |
| 2002/0194490 | A1* | 12/2002 | Halperin | G06F 21/554 726/24 |
| 2007/0271611 | A1* | 11/2007 | Kwan | G06F 21/552 726/22 |

* cited by examiner

*Primary Examiner* — Morshed Mehedi
*Assistant Examiner* — Abiy Getachew
(74) *Attorney, Agent, or Firm* — Ditthavong & Steiner, P.C.

(57) ABSTRACT

An approach for detecting an insider threat is described. Embodiments include determining one or more features from one or more network transfers among a plurality of network entities, determining a baseline behavioral profile of the plurality of network entities based on the one or more features; and determining at least one malicious network entity from among the plurality of network entities based on a systematic deviation from the baseline behavioral profile of at least one of the one or more features.

20 Claims, 17 Drawing Sheets

FIG. 6

| 1.1 | DetectAnomalies (C, T, concThresh, volThresh) |
| --- | --- |
| 1.2 | $A \leftarrow \emptyset$ |
| 1.3 | $i_v \leftarrow$ ComputeVolumetricThresholdIndex(C, volThresh) |
| 1.4 | for $\forall X \in T$ |
| 1.5 | $conc \leftarrow 1 - Entropy(C, T, X)$ |
| 1.6 | $i_x \leftarrow log_2(V(X))$ |
| 1.7 | if $i_x \geq i_v$ $\land$ $conc \geq concThresh$ |
| 1.8 | $A \leftarrow A \cup X$ |
| 1.9 | Return A |

| 2.1 | ComputeVolumetricThresholdIndex (C, volThresh) |
| --- | --- |
| 2.2 | for $i = 0$: maxIndex |
| 2.3 | $V[i] \leftarrow 0$ |
| 2.4 | for $\forall T \in C$ |
| 2.5 | for $\forall X \in T$ |
| 2.6 | $i_x \leftarrow \lfloor log_2(V(X)) \rfloor$ |
| 2.7 | $b[i_x] \leftarrow b[i_x] + V(X)$ |
| 2.8 | $cvol \leftarrow 0$ |
| 2.9 | for $i_v = 0$: maxIndex |
| 2.10 | $cvol \leftarrow cvol + b[i_v]$ |
| 2.11 | if $cvol \geq volThresh$ |
| 2.12 | Return $i_v$ |
| 2.13 | Return maxIndex |

SYSTEM AND METHOD FOR DETECTING INSIDER THREATS

BACKGROUND INFORMATION

Insider threats, such as industrial espionage and theft by an insider (e.g., an employee or other authorized network entity including both users and/or devices) are a growing and significant issue for public and private industries. In many instances, insiders have admitted to taking intellectual property with them to new companies for use in their new positions. As such, many end-users (e.g., businesses, government entities, universities, etc.) attempt to preserve sensitive information (e.g., classified, confidential, etc.) from insider threats using predetermined rules, such as whether an unauthorized insider or network entity has attempted to access such information. However, such rules frequently detect only known methods of misuse with detectable signatures and are thus inadequate to alert users of a potential threat of intent to misuse sensitive information.

Therefore, there is a need for approaches to detect an insider threat, particularly behavior indicating intent to access sensitive information for an unlawful or improper purpose.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 6 illustrates an anomaly detection algorithm, according to an exemplary embodiment.

DESCRIPTION OF THE PREFERRED EMBODIMENT

A preferred method and system for detecting an insider threat is described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

As used herein, an "insider threat" may refer to a threat posed by an authorized access of an authorized object within a secure boundary for a potentially unauthorized purpose. For instance, a malicious network entity (e.g., an authorized user and/or authorized device) possessing the requisite authorization credentials may access an authorized object for an unlawful or illegal purpose. For example, an insider threat may involve fraud, a theft of confidential or commercially valuable information, a theft of intellectual property, a sabotage of computer systems, and the like. As used herein, an "insider" may include a network entity (e.g., a user or device operating in the network) associated with an organization or authorized to act on behalf of the organization. For example, an insider may include an employee, a former employee, an agent, a contractor, a business associate, and others associated with a corporate network, as well as devices operating within the corporate network). The insider may be associated with a user profile, including network credentials (e.g., a username and/or other authenticating information such as biometric credentials, one-time passwords, tokens, etc.). It is contemplated that an insider may include any trusted network entity (e.g., user and/or device) possessing inside information concerning an organization's security practices, data, computing systems, etc. Depending on the context, the terms "network entity," "user," and/or "device" may be used interchangeably with "insider."

Figure 1A:
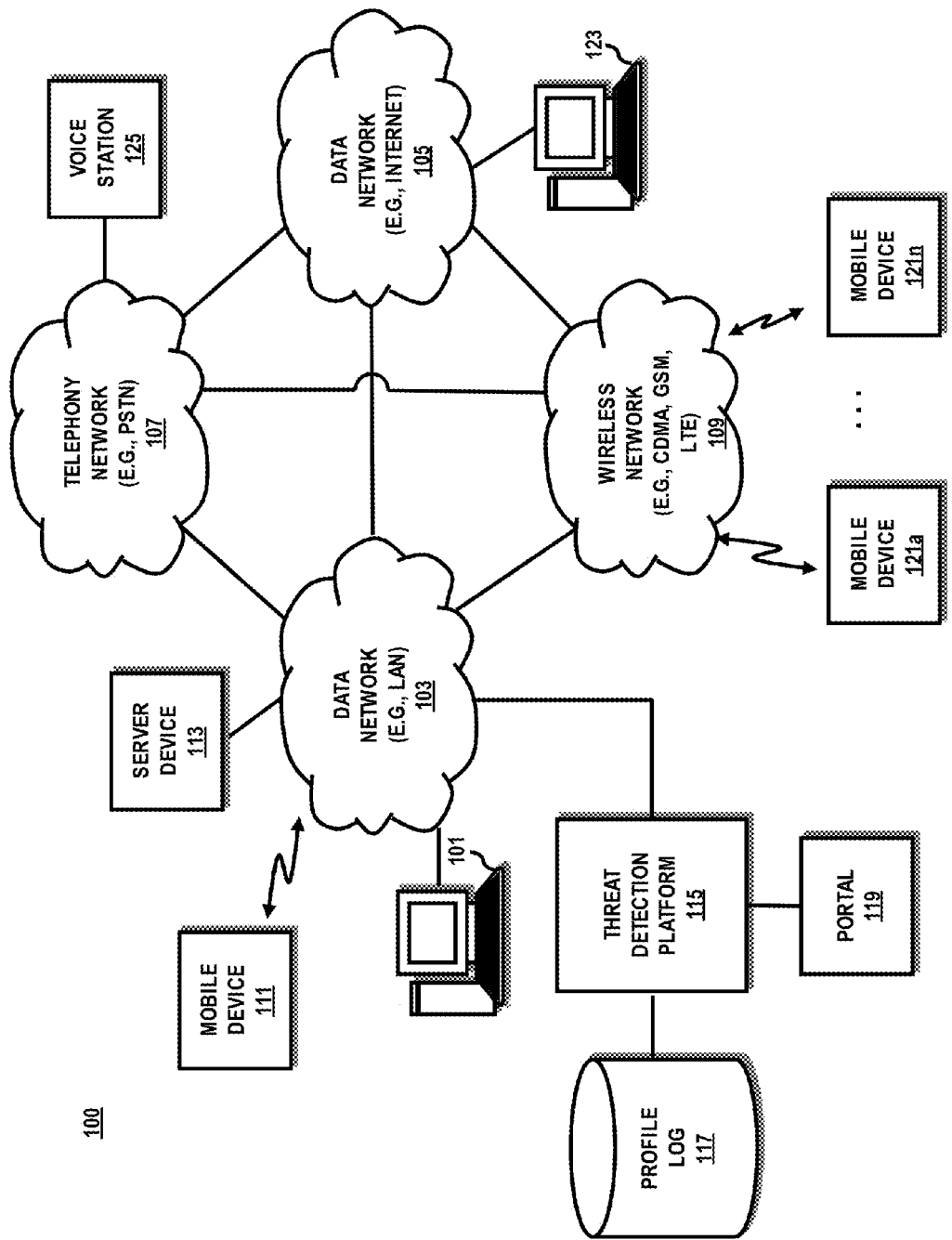
FIG. 1A is a diagram of a communication system capable of detecting an insider threat, according to an exemplary embodiment.

FIG. 1A is a diagram of communication system 100 capable of detecting an insider threat, according to various embodiments. For example, an insider or network entity may include a user at device 101 (e.g., comprising a network entity) accessing network 103. Alternatively, the insider may be a network entity accessing network 103 remotely. For instance, an insider may include a network entity accessing network 103 via networks 105-109. In one embodiment, an insider may include a user having permission to access only a portion of a network. For instance, an insider may be authorized to access specific network resources belonging to a private network but not to access other resources of the network. An insider may include a user authorized to access a server bay that holds server device 113, but not to access sensitive information stored in logs and/or device 101.

In one embodiment, an insider threat may be realized when an authorized insider attempts to access a network resource for an unauthorized, unlawful, or other improper purpose. For instance, the authorized insider may utilize mobile device 111 to access networks 105-109 via network 103 in order to access server device 113 to access trade secret or intellectual property resources of an organization. An insider threat may also be realized if the authorized insider accesses resources for any purpose deemed improper or otherwise not authorized by the organization. As noted, in some embodiments, an insider threat may include the unauthorized use or access of information by an insider. For instance, an insider threat may include an insider with a Universal Serial Bus (USB) memory device containing sensitive information of server device 113, but that is not authorized to use, access, copy, transport, and/or share the sensitive information.

Organizations faced with the risk of theft, fraud, and even espionage of sensitive information by trusted insiders, may rely on background checks to screen insiders. In addition, they may rely on complex rules to monitor for known methods of misuse based on detectable signatures in network data. However, these methods are inadequate, particularly in networks with many insiders accessing a large volume of sensitive information. In particular, it is relatively easy for an insider threat to go undetected because the insider is an authorized network entity at the time the information is accessed. Methods of detecting network misuse based on static signatures/rules may also fail to detect an insider threat because such signatures/rules assume a stable and relatively unchanging background pattern of network transfers. Therefore, a need exists for an adaptive system that is capable of detecting potential insider threats under variable background network traffic patterns.

To address this issue, system 100 of FIG. 1A introduces the capability to detect an insider threat based on specific properties of exfiltration—the unauthorized release or upload of data from within a computer system or network—and collection—the unauthorized storage or download of data assets—traffic. In one embodiment, system 100 determines insider threats based on traffic that is both non-conformist and systematic. As used herein, "non-conformist" may be used to describe the properties of network transfers performed by only a small number of insiders within a set, or cohort, of insiders. As used herein, the term "systematic" may be used to describe properties of network transfers that involve an unusually large amount of data compared to other traffic generated collectively by a cohort of insiders.

Figure 1B:
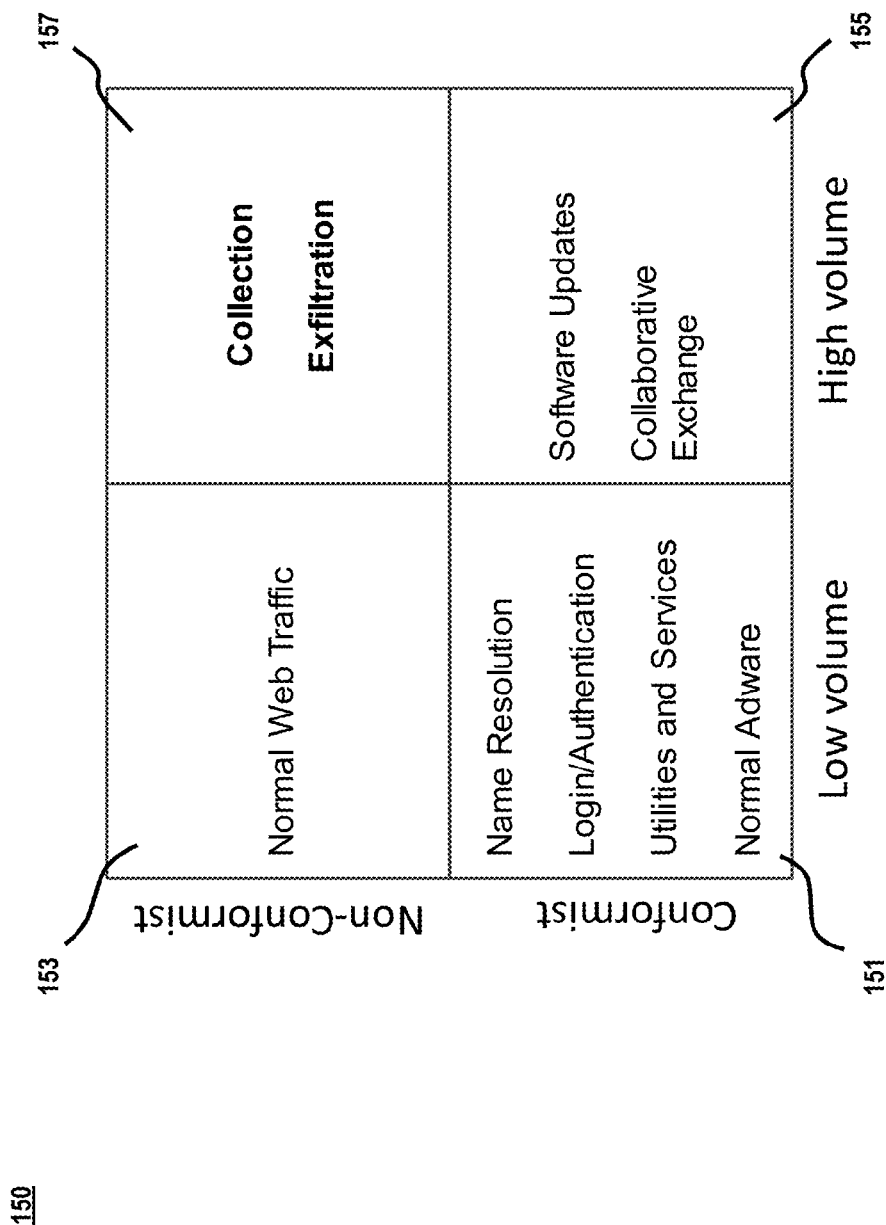
FIG. 1B is a diagram of commonly observed network traffic categories, according to an exemplary embodiment

FIG. 1B illustrates commonly observed categories 150 of network traffic, according to an exemplary embodiment. Examples of low-volume, conformist traffic 151 (lower left quadrant) are standard network services such as DNS or NetBIOS name resolution services, network domain authentication, normal adware generated from web traffic, IP phone connectivity services, time services, email, etc. Examples of low volume, non-conformist traffic 153 (upper left quadrant) are normal web surfing or moderate use of social media by members of an organization. These are typically distinct and carry modest amounts of data. Examples of high-volume, conformist traffic 155 (lower right quadrant) are commonly used software update services and collaborative exchanges, such as file sharing or teleconference software. In contrast, anomalous network traffic (i.e., collection and exfiltration traffic) is both high-volume and non-conformist 157 (upper right quadrant).

In one embodiment, to detect anomalous traffic, a baseline or normal profile of network traffic observed in a certain time interval may be analyzed. As used herein, the term "behavioral profile" may be used to refer a statistical and/or information-theoretic measure with respect to one or more features extracted from the network traffic. A feature may include any network parameter obtained by extracting data in the header or body of a captured network packet. A feature may aggregate the value of a network parameter from multiple captured packets. For example, the aggregate volume of a certain communication session may be determined by adding the transfer volumes of each of the packets belonging to the session. The term "baseline" may be used in conjunction with behavioral profiles to describe a pattern of communication observed during a specified interval or set of intervals that is designated as a baseline profile for determining anomalous behavior. Anomalous behavior or traffic may, therefore, include any network transfer that does not match the pattern of observed traffic according to various measures.

For illustrative purposes, system 100 in FIG. 1A is described with respect to threat detection platform 115. In one embodiment, platform 115 is configured to passively observe or monitor (e.g., via inline monitoring) network transfers between devices on network 103 for the purpose of dynamically learning a baseline behavioral profile of one or more insiders. For instance, platform 115 may extract the value of certain features from packets transmitted to and from computing device 101. Similarly, platform 115 may analyze packets transmitted by mobile device 111 and server device 113. Based on the extracted features, platform 115 may establish the baseline behavioral profile of a cohort of insiders or a particular insider. Profile log 117 may be used to store individual and cohort behavioral profiles established by platform 115. In one embodiment, a network administrator, security manager, or other user may access and interact with platform 115 via portal 119. For example, portal 119 may provide a web-based user interface to allow end-users to configure platform 115 and to receive alerts of an insider threat. As used herein, the term "end-user" may refer to any trusted administrative entity tasked with monitoring and reporting insider threats including, for example, network administrators, security officers, and the like. In one embodiment, the end-user may operate platform 115 to obtain detailed reports and notifications of malicious behavior. In some embodiment, end-users can configure the platform 115 to automatically initiate actions in response to malicious behavior (e.g., deactivating malicious accounts, increase logging activities, terminating network sessions, etc.).

In one embodiment, platform 115 identifies an insider threat from among a group or cohort of insiders based on a systematic deviation of an observed network transfer from the baseline behavioral profile with respect to one or more features. The features may include a volume of one or more network transfers between a specific pair of network entities, a time interval associated with the network transfers, and/or a direction (e.g., upload or download) of the network transfers. Platform 115 may identify the insider threat by determining whether an aggregate volume of the network transfers satisfies a threshold volume value, and determining whether the number of different insiders (e.g., based on their network credentials) that are associated with the network transfers causes an entropy threshold value to be satisfied. In one embodiment, the threshold values are based on the baseline behavioral profile of the network. The threshold volume value may be adjusted based on an aggregate volume distribution associated with the network transfers observed during a particular time interval.

In one embodiment, platform 115 dynamically learns the baseline behavioral profile based on a cohort profile obtained by combining one or more network entity profiles. For example, platform 115 may generate user profiles for each of the insiders on network 103 and aggregate the feature variables for each of the insiders to generate a cohort profile. Platform 115 may then determine an information-theoretic and/or statistical threshold for the cohort profile. For example, platform 115 may analyze the collected data associated with the cohort profile to determine an entropy or statistical measure with respect to one or more feature variables. In one embodiment, platform 115 observes a systematic deviation of one or more data transfers from the baseline behavioral profile when the data transfers simultaneously satisfy the information-theoretic and statistical thresholds.

By way of example, platform 115 may alert an end-user (e.g., security analyst, supervisor, manager, owner, etc.) to a potential insider threat when a network transfer that produces a systematic deviation is observed. In one embodiment, platform 115 may also initiate actions in response to the potential insider threat. For example, the platform 115 can be configured with rules or algorithms for determining appropriate response actions that can be automatically initiated depending on the specific threat. In another example, platform 115 can be configured to perform machine learning or apply artificial intelligence to determine appropriate actions which can then be recommended to end-users or initiated without intervention. Because platform 115 continually updates the baseline behavioral profile, insider threats are less likely to remain disguised or undetected merely by the presence of other network transfers. Specifically, platform 115 advantageously relies on a dynamic cohort profile as opposed to a collection of independently assessed instances of network behavior. For example, an anomaly detection algorithm may analyze an observed network event (e.g., a network transfer) to determine if it conforms to the cohort profile even while the cohort profile is being updated based on all observed network events. In addition, or alternatively, the anomaly detection algorithm may determine if the network event is systematic with respect to the cohort profile. In one embodiment, system 100 may operate in real-time such that the generation of threat alerts is dynamic with respect to observed network conditions. By way of example, platform 115 may utilize big data analytics to perform real-time evaluation of insider threats based on the methods disclosed herein. Alternatively, such analyses may be performed on a previously captured network data stream.

In one embodiment, mobile devices 111 and 121 may be any type of mobile terminal including a mobile handset, mobile station, mobile unit, multimedia computer, multimedia tablet, communicator, netbook, Personal Digital Assistants (PDAs), smartphone, media receiver, etc. It is also contemplated that mobile devices 111 and 121 may support any type of interface for supporting the presentment or exchange of data. In addition, mobile devices 111 and 121 may facilitate various input means for receiving and generating information, including touch screen capability, keyboard and keypad data entry, voice-based input mechanisms, accelerometer (e.g., shaking mobile devices 111 and 121), and the like. Any known and future implementations of mobile devices 111 and 121 are applicable. It is noted that, in certain embodiments, mobile devices 111 and 121 may be configured to transmit information (e.g., audio signals, words, address, etc.) using a variety of technologies—e.g., near field communications (NFC), Bluetooth™, infrared, etc. Also, connectivity may be provided via a wireless local area network (LAN). By way of example, a group of mobile devices 111 and 121 may be configured to a common LAN so that each device can be uniquely identified via any suitable network addressing scheme. For example, the LAN may utilize the dynamic host configuration protocol (DHCP) to dynamically assign "private" DHCP Internet protocol (IP) addresses to each mobile device 111 and 121, e.g., IP addresses that are accessible to devices connected to network 103 as facilitated via a router.

According to certain embodiments, one or more networks, such as data network 103, telephony network 107, and/or wireless network 109, may interact with data network 103. Networks 103-109 may be any suitable wireline and/or wireless network, and be managed by one or more service providers. For example, data network 105 (and 103) may be any LAN, metropolitan area network (MAN), wide area network (WAN), the Internet, or any other suitable packet-switched network, such as a commercially owned, proprietary packet-switched network, such as a proprietary cable or fiber-optic network. For example, computing device 123 (and 101) may be any suitable computing device, such as a VoIP phone, skinny client control protocol (SCCP) phone, session initiation protocol (SIP) phone, IP phone, personal computer, softphone, workstation, terminal, server, etc. Telephony network 107 may include a circuit-switched network, such as the public switched telephone network (PSTN), an integrated services digital network (ISDN), a private branch exchange (PBX), or other like network. For instance, voice station 125 may be any suitable plain old telephone service (POTS) device, facsimile machine, etc. Meanwhile, wireless network 109 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, networks 103-109 may be completely or partially contained within one another, or may embody one or more of the aforementioned infrastructures. It is further contemplated that networks 103-109 may include components and facilities to provide for signaling and/or bearer communications between the various components or facilities of the system 100. In this manner, networks 103-109 may embody or include portions of a signaling system 7 (SS7) network, IMS, or other suitable infrastructure to support control and signaling functions. While specific reference will be made thereto, it is contemplated that system 100 may embody many forms and include multiple and/or alternative components and facilities. For example, it is contemplated that the present disclosure may be utilized for insider threat detection in various network environments, including supervisory control and data acquisition (SCADA) networks and related protocols such as distributed network protocol (DNP) or International Electrotechnical Commission (IEC) protocols (e.g., DNP3 and IEC60870-5).

FIG. 2 is a diagram of the components of threat detection platform 115, according to one embodiment. Platform 115 may comprise computing hardware (such as described with respect to FIGS. 5 and 7), as well as include one or more components configured to execute the processes described herein for monitoring behavior of an insider and detecting a potential insider threat. It is contemplated that the functions of these components may be combined in one or more components or performed by other components of equivalent functionality. In one implementation, platform 115 includes controller 201, feature vector module 203, profile module 205, clustering module 207, threshold module 209, anomaly detection module 211, alert module 213, and communication interface 215.

Controller 201 executes at least one algorithm for executing functions of platform 115. For example, controller 201 may interact with communication interface 215 to observe one or more network transfers belonging to various data streams on network 103. Controller 201 may simultaneously interact with feature vector module 203, profile module 205, clustering module 207, and anomaly detection module 211 to determine whether to cause alert module 213 to generate or record a notification regarding a potential insider threat.

In one embodiment, controller 201 may utilize feature vector module 203 to extract and collect (e.g., via inline monitoring of network 103) one or more features from live, high-volume network traffic packets. For example, feature vector module 203 may observe a network event (e.g., a communication with a particular server) for an insider and record the value of various features extracted from the network event to feature variables of a feature vector. In one embodiment, a single feature vector may correspond to a single network transfer that includes multiple network events or communications. For example, depending on the underlying communication protocol, a network event may be one of a series of network transfers or communications between a client device (e.g., mobile device 111) and a server device (e.g., server device 111) to obtain a particular result (e.g., access a web page).

In one embodiment, feature vector module 203 extracts information from each event or communication and generates a feature vector to record the information in the communication. By way of example, feature vector module 203 may extract specific elements from a protocol header of a packet, including protocol (e.g., TCP/UDP), timestamp, frame/packet size, network credentials, source address, destination address, source port, and destination port. Alternatively, feature vector module 203 may extract information from previously captured traffic packets. In one embodiment, feature vector module 203 stores the generated feature vectors in a database combined with or connected to platform 115. For instance, each feature vector may correspond to a row in a database maintained in dynamic memory.

As used herein, the term "instance coordinate" may be used to describe a feature vector in terms of an n-dimensional space. Each feature variable in a feature vector may be treated as a dimension in the n-dimensional space. Thus, a particular feature extracted from a network transfer may represent the magnitude of the feature vector along a particular dimension. In one embodiment, an instance coordinate includes an instance count K>0, which corresponds to the number of network transfers sharing features $\{x_1, x_2, \ldots, x_n\}_i$ of n feature variables:

$$X_i = \{\{x_1, x_2, \ldots, x_n\}, K\} \quad (1)$$

The n feature variables may include without limitation, a session start/end time, a client host IP address, a client host hardware address, a client host TCP/UDP port number, a server host IP address, a server host hardware address, a server host TCP/UDP port number, a direction of data flow (e.g., upload or download), network credentials, a machine name, a number of packets transmitted in the session or stream, a protocol identifier, and a transfer volume (measured in bytes).

In one embodiment, feature vector module 203 combines or aggregates features of a feature vector. For instance, feature vector module 203 may aggregate all feature vectors observed in a set time interval for a particular user session involving multiple network transfers and obtain a cumulative transfer volume. In such cases, the cumulative transfer volume may be described as the product of the volume coordinate and the instance count:

$$V(X_i) = [K \cdot x_v]_i \quad (2)$$

In one embodiment, controller 201 utilizes profile module 205 to determine profiles of one or more insiders. A profile may be associated with an individual insider (e.g., a user profile) or with a group of insiders (e.g., a cohort profile). In one embodiment, profile module 205 generates a user profile by combining the information of all feature vectors associated with a specific user and generated during a certain time interval. In one embodiment, profile module 205 may utilize the instance count of a feature vector to generate a ranking of all feature vectors observed with respect to a particular user. For example, profile module 205 may record the instance counts associated with network transfers between various pairs of network entities. It is contemplated that the number of features utilized to generate a profile may be varied based on a desired level of detail or granularity.

Figure 2A:
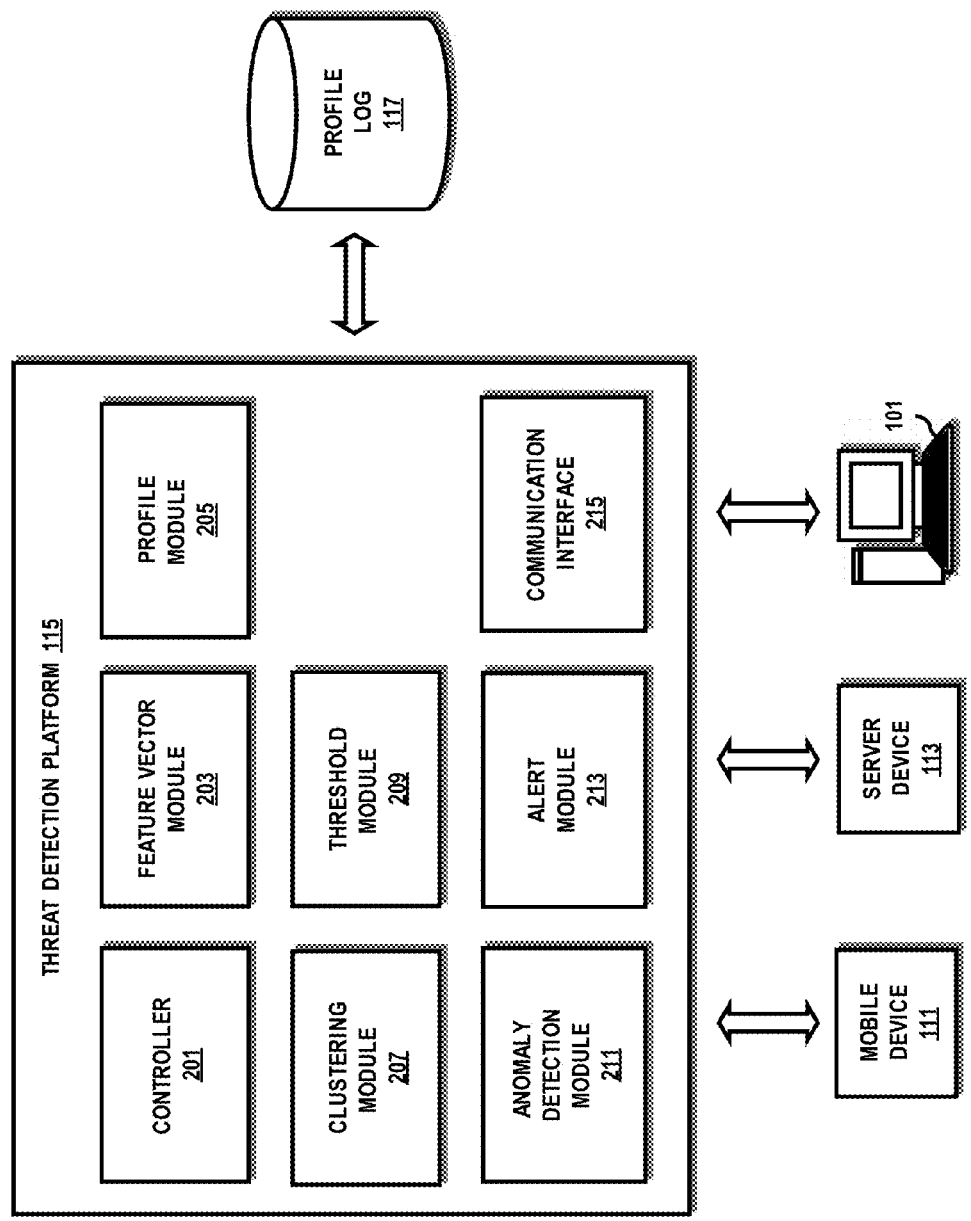
FIG. 2A is a diagram of the components of a platform configured to detect an insider threat, according to one embodiment.
Figure 2B:
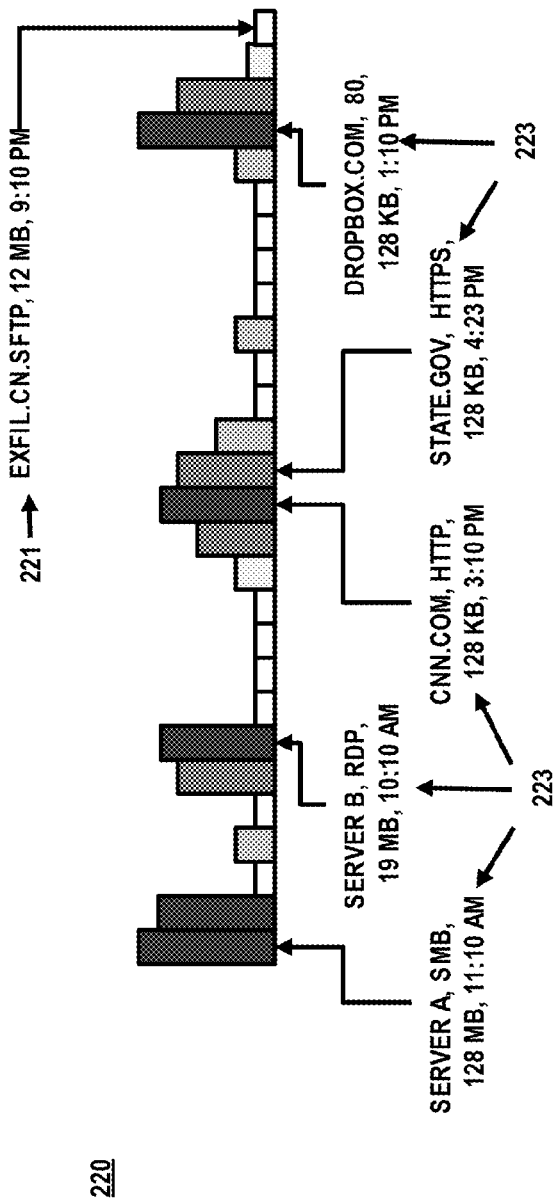
FIG. 2B illustrates a series of network transfers associated with an insider, according to an exemplary embodiment.

FIG. 2B illustrates a series 220 of network transfers 221 and 223 associated with a specific user. In one embodiment, feature vector module 203 extracts and records features from each of the observed network transfers 221 and 223. Thus, network transfer 221 (e.g., "EXFIL.CN, SFTP, 12 MB, 9:10 PM") may be analyzed and the destination ("EXFIL.CN, SFTP"), protocol (secure FTP), transfer size (12 MB), and time (9:10 PM) features are extracted and recorded in a feature vector. Other features may include a device (e.g., server device 113) or web address (e.g., cnn.com, state.gov, dropbox.com, etc.) accessed by computing device 101, a type of connection (e.g., server message block (SMB), remote desktop protocol (RDP), hypertext transfer protocol (HTTP), hypertext transfer protocol secure (HTTPS), etc.), a payload, an amount of data accessed, a time, and the like for the user.

Figure 2C:
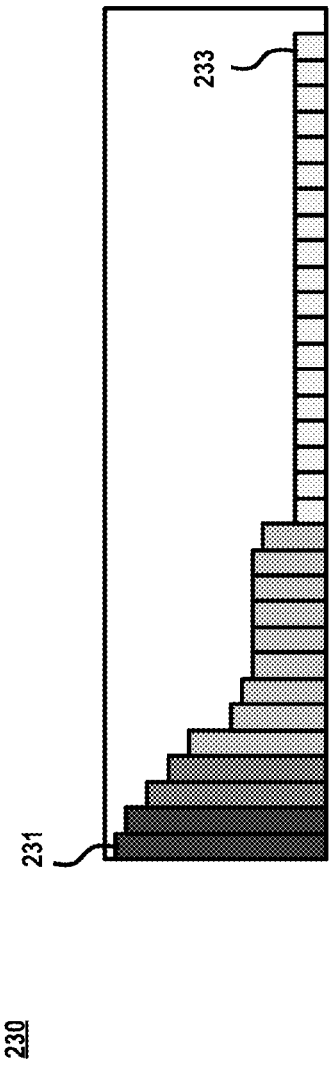
FIG. 2C illustrates a series of ranked feature vectors associated with an insider, according to an exemplary embodiment.

FIG. 2C illustrates an instance count distribution 230 of feature vectors associated with a specific user ranked in descending order according to their frequency. Thus, feature vector 231 corresponds to the most frequently observed feature vector. For example, feature vector 231 may have the highest instance count because it relates to a popular web site or a proxy server. Feature vector 231 may also relate to an automated data service that runs continually in the background. At the other end of distribution 230, feature vector 233 corresponds to the least frequently observed feature vector.

In one embodiment, profile module 205 may utilize feature vector module 203 to determine a cohort profile. Profile module 205 may aggregate or otherwise combine feature variables from different feature vectors to create a cohort profile for a group of insiders. For example, the transfer size feature from different feature vectors may be added if the feature vectors all relate to the same source or destination address. In such cases, the specific identity of the sender or receiver may be disregarded. In one embodiment, profile module 205 may take the sender or receiver into account in order to determine a user profile. That is, features from different feature vectors may only be combined if they all relate to the same user or other network entity. Furthermore, it is contemplated that network transfers associated with different network credentials may be combined if they are associated with the same person or other network entity. For example, an authorized individual may utilize multiple sets of user account credentials (e.g., username and password credentials). Additionally, or alternatively, feature vector module 203 may optionally separate behavioral features of a single user account into multiple feature vectors if, for instance, a single set of user account credentials is used by two or more insiders (e.g., shift work using a common log-in).

In one embodiment, profile module 205 interacts with controller 201 and feature vector module 203 in real-time as network traffic is being captured and processed. Feature vector module 203 may collect more data from devices on data network 103 than can be stored in memory for evaluating insider behavior. It is therefore contemplated that feature vector module 203 and profile module 205 may implement a "sliding time window" technique to analyze only the recent interval data that is stored in memory of platform 115. The sliding window may be used to remove information older than a certain limit (e.g., 90 or 120 days) from the feature vectors, behavior profiles, and group identifications of insiders.

In one embodiment, profile module 205 may interact with clustering module 207 to determine a clustering of a feature with respect to various groupings of users or other network entities. As used herein, the term "clustering" may be used to refer to the degree of heterogeneity of a particular feature with respect to the number of users or other network entities associated with the feature. For example, a feature that is only observed with respect to a single user may be characterized as exhibiting weak clustering and vice versa. In one embodiment, clustering may be measured based on a statistical distance function. In one embodiment, clustering may be utilized to characterize a selected feature with respect to a group or cohort of insiders. For example, instance coordinates of features that exhibit a high (or strong) degree of clustering may be described as "systematic." Conversely, instance coordinates of features with a low (or weak) degree of clustering may be described as "noisy" and associated with high uncertainty and surprise.

In one embodiment, profile module 205 may generate cohort profiles corresponding to various groupings of users or other network entities. The selection of network entities for inclusion in a particular cohort may be based on the similarity of their role in the organization, level of access to proprietary information, etc. In one embodiment, a cohort may be understood as $C_q^{(l)}$ for cluster q at similarity level 1. In one embodiment, the similarly level 1 may correspond to various administrative groupings in an organization. That is, similarity refers to a similarity among a set of users or other network entities. For example, the cohort profiles may include a profile for a team, a department, or an entire organization. Thus, user groups of various sizes may be made the target of the anomaly detection techniques described herein.

Figure 2D:
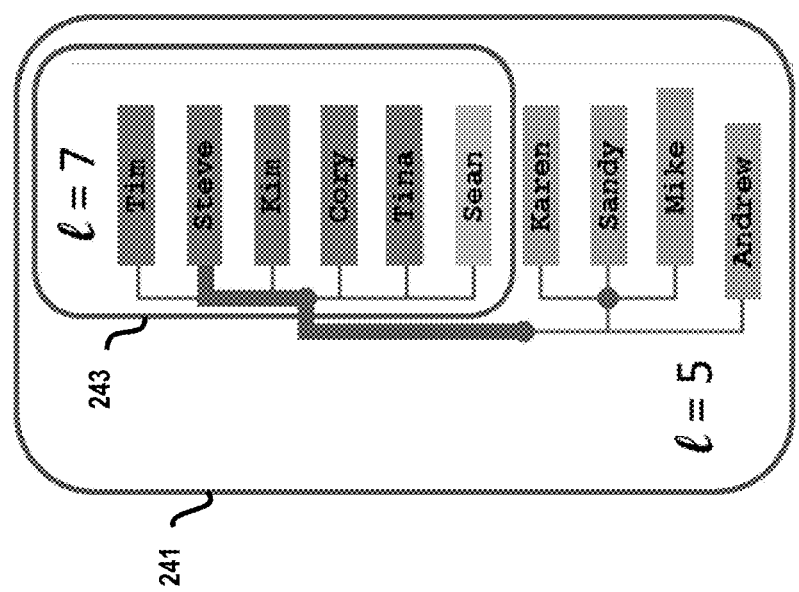
FIG. 2D illustrates groups or cohorts of clustered insiders, according to an exemplary embodiment.

FIG. 2D illustrates various groupings of network entities at different similarity levels. By way of example, reference is made to FIG. 2D illustrating two cohorts 241 and 243 operating at different similarity levels. For example, cohort 241 operates at a similarity level of five (5) and includes ten target insiders (Tim, Steve, Kim, Cory, Tina, Sean, Karen, Sandy, Mike, and Andrew). Included within cohort 241 is cohort 243 of greater similarity operating at similarity level seven (7) that includes six target insiders (Tim, Steve, Kim, Cory, Tina, and Sean). For instance, cohort 241 may correspond to a product development team (e.g., mobile device team) and cohort 243 may correspond to a set of insiders working on a particular aspect of product development (e.g., user interface design).

In one embodiment, each cohort $C_q^{(l)}$ may include target insiders $\{T_{q,j}\}$, where j is the target insider index in the cohort $C_q^{(l)}$. For each target insider $T_{q,j}$ (or simply $T_j$ when cohort q is implied), one or more network transfers may have been observed by a network sensor. A cumulative volume may be determined for an instance coordinate (Xi) as the product of its volume coordinate ($x_v$) and the instance count (K):

$$V(X_i) = [K \cdot x_v]_i \tag{3}$$

Suppose target insider $T \in C_q^{(l)}$ and all the feature vectors observed of all targets within cluster $C_q^{(l)}$ are $\{X_1, X_2, \ldots\}$. Then $\{X_1, X_2, \ldots\} | T$ refers to all the feature vectors observed specifically from target insider T for all times. Timeframes and other restrictions may be applied to the instance volume calculations. For example, an instance coordinates may be used to specify one or more targets within a start and end time:

$$Z = (\{T_{q,1}, T_{q,2}, \ldots\}, \langle t_{start}, t_{end} \rangle) \tag{4}$$

and can apply a constraint to any set of instance coordinates such that $X | Z \subseteq X$.

In one embodiment, clustering module 207 may determine a clustering with respect to the instance count K. A strong clustering indicates that a maximum number of users or other network entities were associated with an observed set of shared features. For example, a strong clustering may be indicated with respect to a web server's destination IP address if it is being accessed by each of a large number of users a roughly equal number of times. Conversely, a weak clustering may indicate that a particular server is mostly accessed by a single user or small subset of the total number of users. In one embodiment, clustering may be determined by ordering m instance coordinates by descending instance count:

$$X_{(1)}, X_{(2)}, \ldots, X_m : K_{(1)} \geq K_{(2)} \geq \ldots \geq K_{(m)} \tag{5}$$

Then, we can define the empirical cumulative distribution function (CDF) as:

$$\hat{F}_K(x, k) = \frac{\sum_{i=1}^{l} K_{(i)} : K_{(i)} \leq k}{\sum_{i=1}^{m} K_{(i)}} \tag{6}$$

Figure 2E:
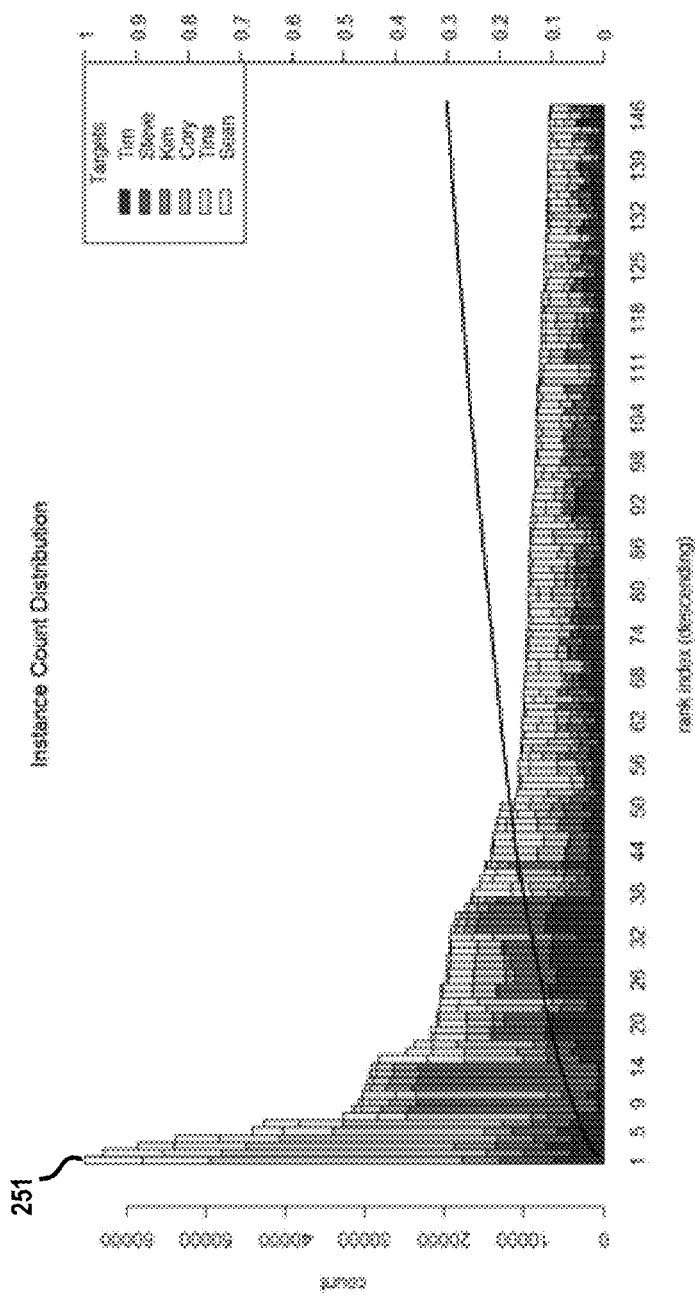
FIG. 2E illustrates an instance count distribution, according to an exemplary embodiment.

Continuing with our example from FIG. 2D, FIG. 2E illustrates an instance count distribution for the top 30% of the most frequently occurring instance coordinates for cohort 243 ($C^{(7)}$={Tim, Steve, Kim, Cory, Tina, Sean}). The high-count feature vectors (left side) should isolate the systematic, and predictable behavior of the constituent targets in any cluster (i.e., systematic instances), whereas the low-count feature vectors (right tail) are associated with high uncertainty and surprise (i.e., noise instances).

A strong clustering globally maximizes the number of systematic feature vectors if a large number of users or other network entities contributed to the total count. For instance, the left side of the distribution shown in FIG. 2E indicates that the most frequently occurring instance coordinates are also the ones shared by most of the users within the cluster (i.e., they are clustered together due to a high number of systematic, conformist instances). For example, instance coordinate 251 has the highest number of feature vectors with each of the cohort targets contributing significantly to the total instance count.

In one embodiment, a degree of heterogeneity with respect to the number of different users associated with a set of shared features may be measured by an information-theoretic function such as entropy. High entropy, systematic feature vectors may be described as conformist, whereas low entropy, systematic feature vectors may be described as non-conformist. Similarly, other feature vectors may also indicate high entropy with respect to instance count. In general, the top 30% of the most frequently occurring feature vectors are high entropy, systematic instances of observed network events. The entropy HK of a feature vector as represented by instance coordinate $X_i$ may be defined as:

$$H_K(X_i) = -\Sigma_{T \in C} p_{K,X_i,T_j} \log_{|C|} p_{K,X_i,T_j} \qquad (7)$$

where zero-count contributions are assigned zero entropy. The probability of target T producing an observation of the ith instance coordinate can be estimated as:

$$P_K(T = T_j \mid X = X_i) = p_{k,X_i,T_j} = \frac{K_{i,T_j}}{\sum_{T \in C} K_{i,T}} \qquad (8)$$

As the volume of data transferred in a single session between a pair of network entities (e.g., mobile device 111 and server device 113) may vary widely, the total data volume transferred may be more important than the number of sessions in the transfer. In one embodiment, clustering module 207 may rank m feature vectors in descending order of cumulative volume:

$$X_{(1)}, X_{(2)}, \ldots, X_{(n)}; V_{(1)} \geq V_{(2)} \geq \ldots \geq V_{(m)} \qquad (9)$$

and compute the entropy of a particular feature vector, based on volume, measured in bytes, instead of instance count. The probability estimate utilized to estimate entropy may be altered slightly to account for volume, instead of count:

$$P_v(T = T_j \mid X = X_i) = p_{v,X_i,T_j} = \frac{V_{i,T_j}}{\sum_{T \in C} V_{i,T}} \qquad (10)$$

Figure 2F:
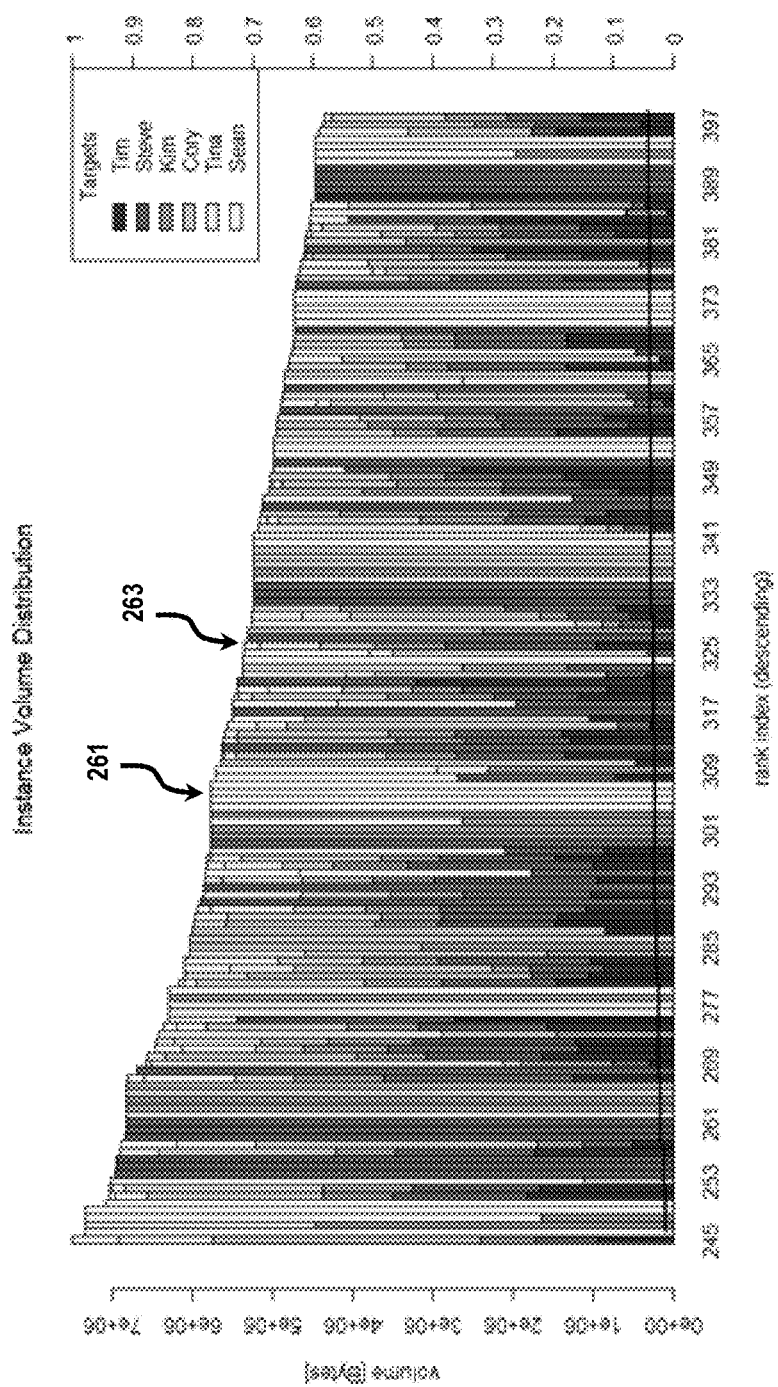
FIG. 2F illustrates an instance volume distribution, according to an exemplary embodiment.

FIG. 2F illustrates a very small slice of an instance volume distribution 260, where the cumulative volume $\hat{F}_v(X_{(i)})$ ranges between 0.01 and 0.04. Some feature vectors (e.g., feature vectors 261) are attributable to a single user or other network entity and appear as solid-colored bars. Other feature vectors (e.g., feature vectors 263) are attributable to multiple users and are shown as multicolored bars. Therefore, the computed entropy for non-conformist feature vectors 261 is predictably low; that of conformist feature vectors 263 is high.

In one or more other embodiments, clustering module 207 may utilize a statistical distance function instead of an entropy function to determine clustering with respect to a feature. For example, clustering module 207 may utilize a Pearson product-moment correlation coefficient (PPMCC or PCC). In one embodiment, clustering module 207 may use the PPMCC results to identify clusters having similar behavior patterns, and/or establish hierarchical groups of insiders. Continuing with the example presented in FIG. 2D, clustering module 207 may compare feature vectors of all insiders in an organization and determine the cohorts at level 5 and 7 based on a similarity of one or more features. Six of the insiders may be combined into cohort 243, because they have the shortest statistical distance between their respective features.

In one embodiment, controller 201 may utilize threshold module 209 to determine threshold values that may be used to detect an insider threat. For example, the threshold values may be determined based on a baseline behavioral profile generated by profile module 205 for a cohort. In one embodiment, the threshold values may be based on an aggregate volume distribution. The aggregate volume distribution may be obtained by generating a volume index that ranks feature vectors according to their volumes. For example, the aggregate volume distribution may be a distribution over the cumulative volume V of each feature vector as represented by an instance coordinate X. In one embodiment, threshold module 209 may apply a threshold to the upper percentile of the volume distribution in order to separate out the feature vectors responsible for the most data transferred.

Figure 2G:
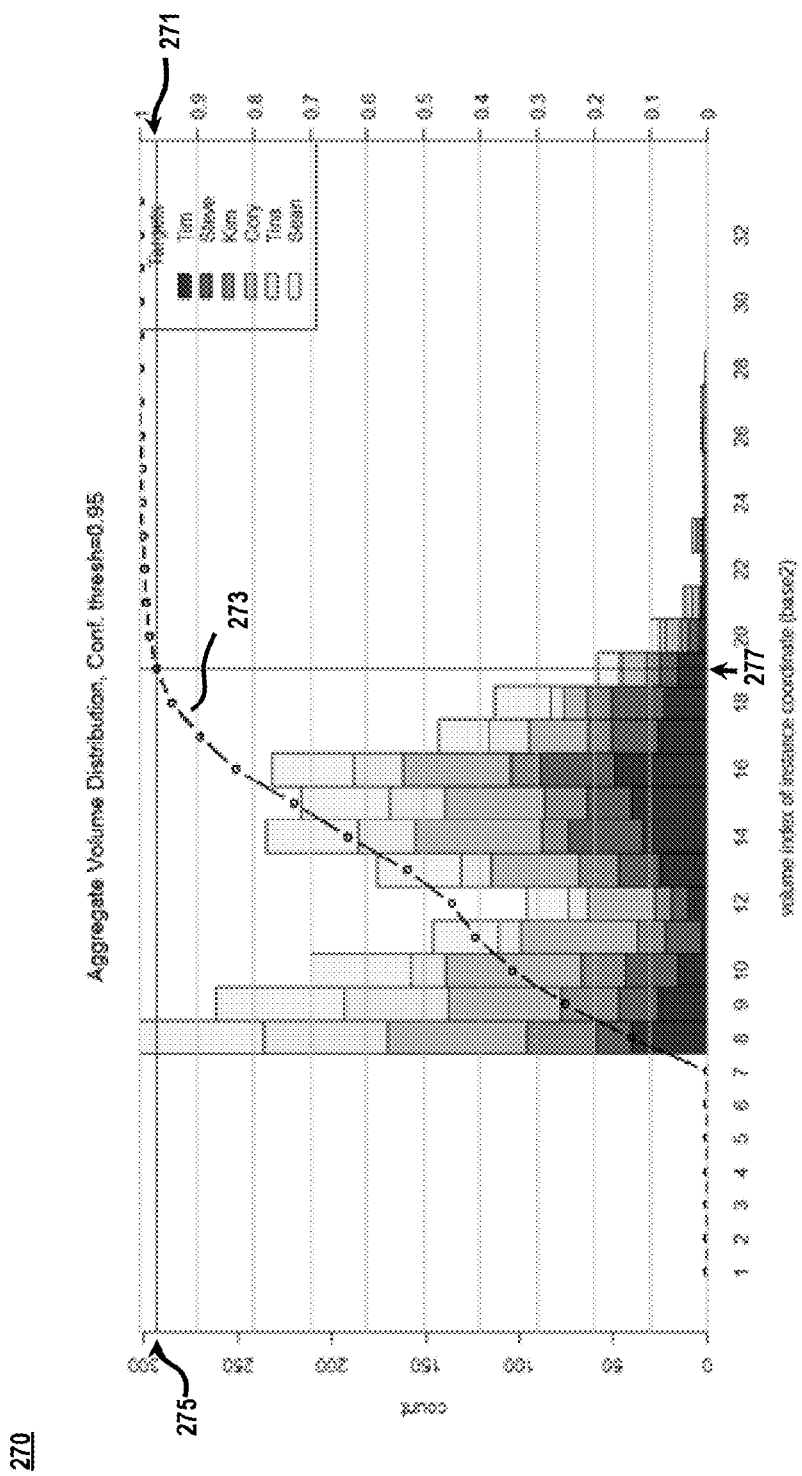
FIG. 2G illustrates an aggregate volume distribution, according to an exemplary embodiment.

Continuing with the example presented in FIG. 2D, FIG. 2G illustrates an aggregate volume distribution 270 for cohort 241 ($C^{(7)}$={Tim, Steve, Kim, Cory, Tina, Sean}). Percentile threshold 271 ($\kappa_v$) indicates a 95% percentile based on cumulative distribution 273. Percentile threshold 271 may be used to determine instance count threshold 275 and instance volume threshold 277. The determined instance count and instance volume threshold values may be utilized to detect anomalous network transfers. In one embodiment, a network transfer that simultaneously satisfies both the instance count and instance volume thresholds is systematic and non-conformist in relation to the cohort profile. Thus, all feature vectors that equal or exceed percentile threshold 271 may be treated as anomalous. In one embodiment, anomaly detection module 211 may utilize instance count threshold 275 and instance volume threshold 277 to detect a potential insider threat.

It is contemplated that platform 115 may optimize the internal organization and storage of instance count and instance volume information to improve computational efficiency. In one embodiment, distribution 270 is generated on a logarithmic scale to avoid extremely long-tailed distributions that may be produced by the vast majority of sessions transmitting small amounts of data. By way of example, threshold module 209 may adopt a base-2 logarithmic bin spacing ($\log_2(V)$) for storage of instance count information.

In one embodiment, controller 201 may utilize anomaly detection module 211 to formulate a null hypothesis that treats all traffic as volumetrically normal (not anomalous) and belonging to the same statistical distribution. However, anomaly detection module 211 may reject the null hypothesis and treat a feature vector as anomalous by volume if it exceeds the established thresholds. In one embodiment, the null hypothesis is rejected for a feature vector that, in addition to exceeding instance volume threshold 277, is non-conformist. That is, a feature vector may be considered anomalous if it is associated with a high volume as well as low entropy. In one embodiment, non-conformity may be measured in terms of a concentration value that reflects the number of different users or other network entities contributing to the feature vector's instance count:

$$\mathrm{Conc}(X) = 1 - H_K(X) \qquad (11)$$

The concentration is obtained by subtracting the entropy of the feature vector from 1 for convenience, where 1 indicates a feature vector distinct to a single user and 0 indicates an equal distribution amongst all users within the cohort. When the concentration is less than 1, some non-zero proportion of the feature vector is shared across multiple users. Table 1 illustrates examples of high and low concentration feature vectors.

TABLE 1

| Server IP, Server Port, Bytes, Shift, Direction | Tim | Steve | Kim | Cory | Tina | Sean | Conc. |
|---|---|---|---|---|---|---|---|
| 69.171.248.16, 443, tcp, 1024, 16:00-20:00, UPLOAD | 0 | 0 | 17 | 0 | 0 | 2,221 | 0.98 |
| 132.245.3.214, 443, tcp, 8192, 12:00-16:00, DOWNLOAD | 37 | 42 | 31 | 55 | 31 | 34 | 0.01 |

The non-conformist feature vector ("69.171.248.16, 443, tcp, 1024, 16:00-20:00, UPLOAD") with concentration 0.98 has a disproportionate number of counts under the user Sean, but the highly conformist feature vector ("132.245.3.214, 443, tcp, 8192, 12:00-16:00, DOWNLOAD") with concentration 0.01 has been observed multiple times by every member of the cohort.

Figure 2H:
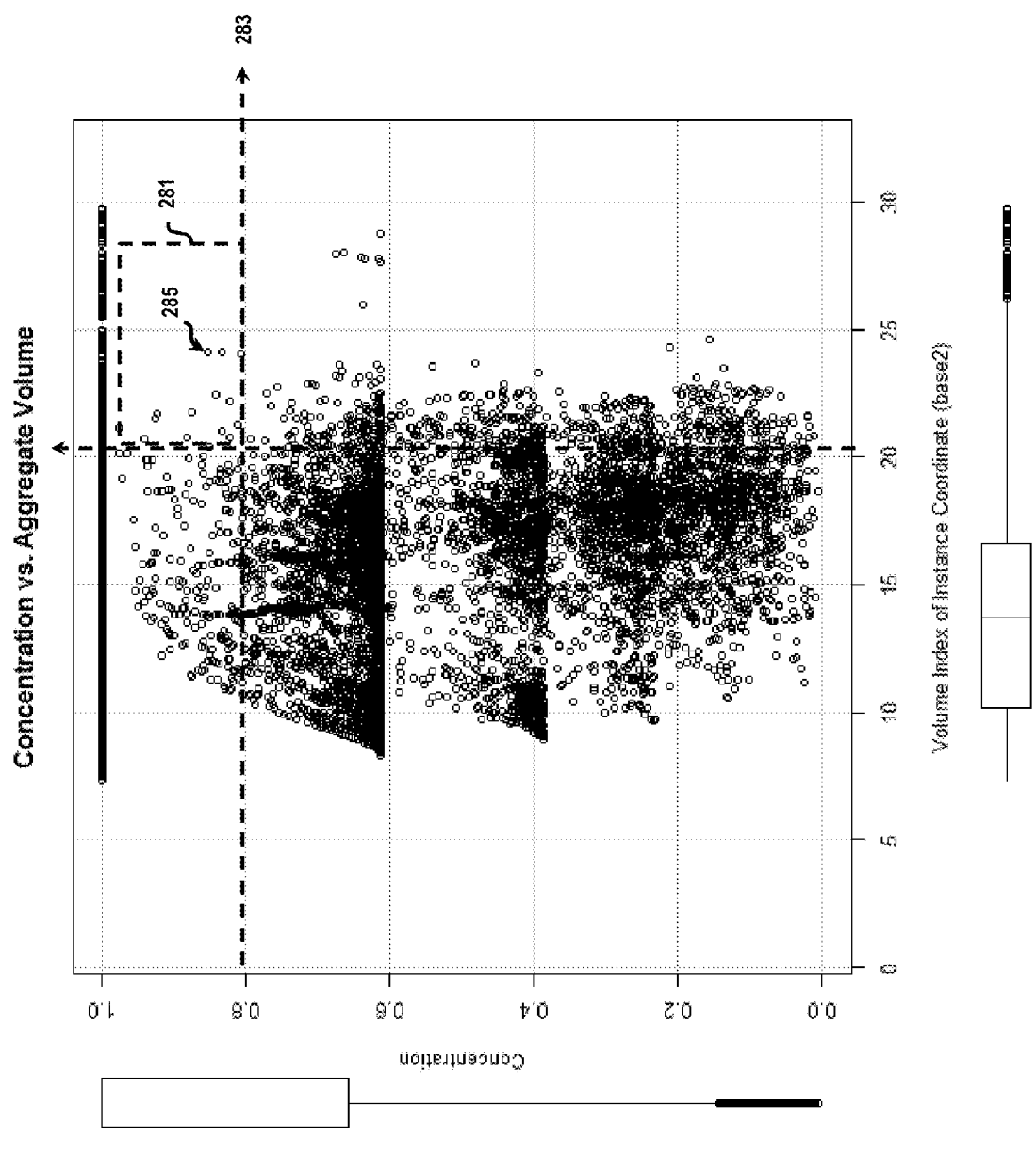
FIGS. 2H and 2I illustrate a detection of a malicious insider, according to an exemplary embodiment.
Figure 2I:
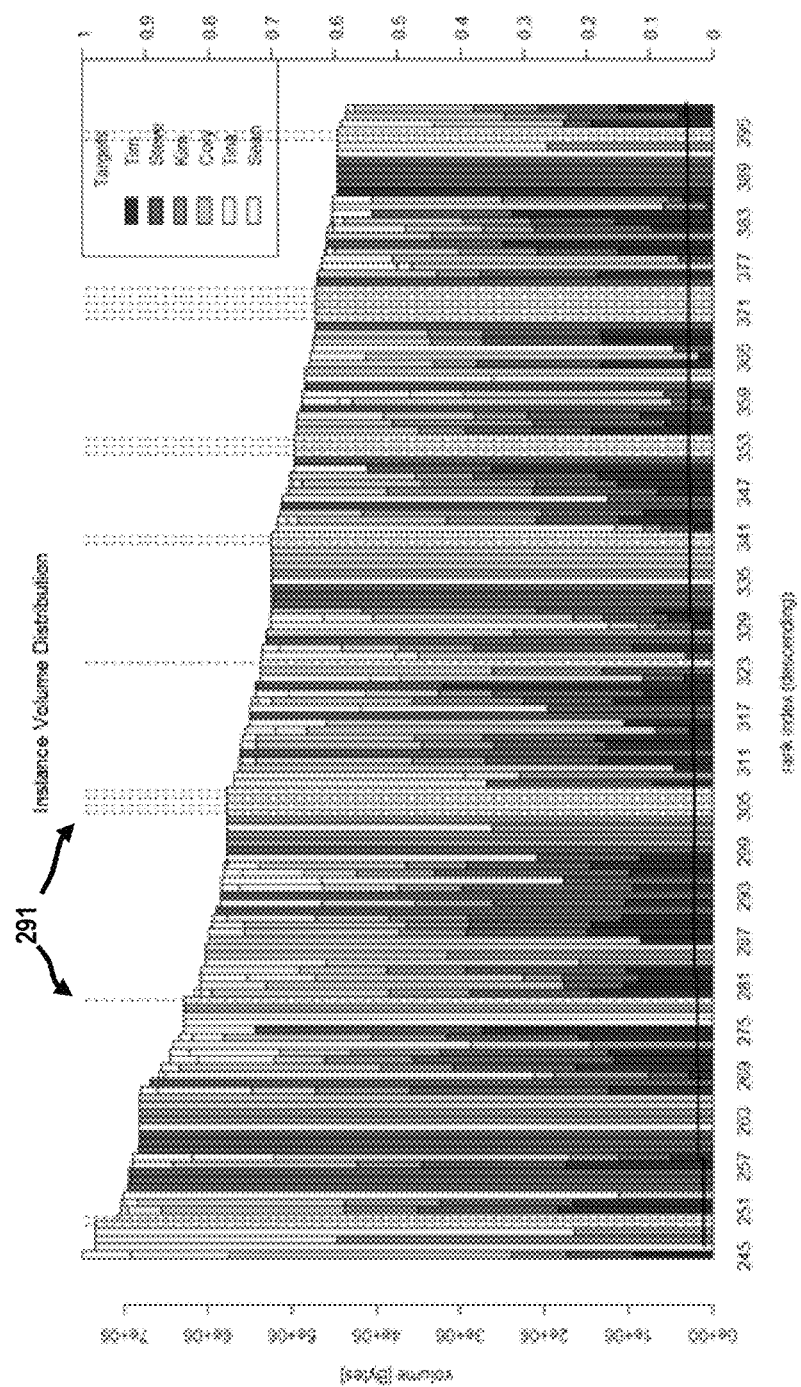

FIGS. 2H and 2I illustrate an identification of a set of anomalous network transfers that may indicate a potential insider threat. FIG. 2H illustrates a scatterplot 280 of concentration and volume generated by the level 7, six-target cohort ($C^{(7)}$={Tim, Steve, Kim, Cory, Tina, Sean}) in the example of FIG. 2D. In other words, the points indicated on the scatterplot correspond to network transfers observed for the level 7 cohort. The horizontal axis has a logarithmic spacing corresponding to a logarithmic bin scaling, as discussed above in relation to anomaly detection module 211. The vertical axis represents a concentration value determined according to Equation (11). The concentration value ranges from 0 to 1 and may be determined for each observed network transfer. A concentration value closer to 1 indicates that the network transfer was only observed in relation to a single insider. Conversely, the closer the concentration value is to 0, the greater the number of insiders associated with the observed network transfer.

By way of example, region 281 defines the network traffic anomalies. Specifically, boundary 283 defines a concentration threshold of 0.8 and a 95% confidence boundary as illustrated in FIG. 2G. Continuing with the example in Table 1, the network transfers in region 281 (e.g., network transfer 285) may include a large download from a file server to a user machine, a large transfer to DropBox™, a series of unusually large email attachments from one user, or a download generated by a network spider. Such network transfers may warrant further investigation because they are both non-conformist and systematic. For example, a security analyst or other person responsible for monitoring insider threats may flag such transfers for further investigation.

In one embodiment, once one or more anomalous network transfers have been identified, they can be attributed to specific users or other network entities. FIG. 2I illustrates instance volume distribution 290 (as illustrated in FIG. 2F) with Sean's identified anomalies 291. As indicated by the absence of any other insider, each of identified anomalies 291 has a high concentration (or low entropy) with respect to one target (Sean). Identified anomalies 291 are suspicious because they indicate a lone insider accessing a network resource to either download or upload a large amount of data. Based on this information, further investigation by a network security analyst may be warranted in order to learn the nature of the information that was exchanged and other relevant contextual details. In one embodiment, controller 201 may utilize alert module 213 to selectively deliver a notification that a behavior of an insider may be malicious.

By way of example, alert module 213 alerts an end-user (e.g., system administrator, security analyst) when the number of anomalous network transfers observed with respect to a particular insider exceeds a threshold value (e.g., 5 or more counts, more than 150% of a mean of anomalies of a group of insiders, etc.). The alert may be sent via any means, for instance, an instant message (IM), an e-mail, an audible indicator, a graphical indicator, and the like. Additionally, alert module 213 may determine whether the insider has particular anomalies to exclude. For example, alert module 213 may be configured to overlook reported anomalies associated with benign behavior (e.g., accessing a social media website), as adjudicated by an end-user. Alternatively, or additionally, alert module 213 may raise an alert whenever a particular (threatening) feature behavior is detected, such as transferring sensitive information to a file host service (e.g., cloud storage). In yet another embodiment, the alert module 213 can initiate actions in response to determined threats as previously discussed.

In one embodiment, controller 201 may utilize communication interface 215 to communicate with other components of system 100 in FIG. 1A. Communication interface 215 may include multiple means of communication. In one embodiment, communication interface 215 may communicate over short message service (SMS), multimedia messaging service (MMS), IP, instant messaging, voice sessions (e.g., via a phone network), e-mail, NFC, QR code, or other forms of communication. Additionally, communication interface 215 may include a web portal (e.g., service provider portal 119) accessible by, for example, mobile devices 111 and 121, computing devices 101 and 111, and the like.

It is contemplated that platform 115 may include an authentication identifier when transmitting signals to prevent unauthorized access. For instance, control messages may be encrypted, either symmetrically or asymmetrically, such that a hash value can be utilized to authenticate received control signals, as well as ensure that those signals have not been impermissibly alerted in transit. As such, communications with platform 115 may include various identifiers, keys, random numbers, random handshakes, digital signatures, and the like.

Figure 3A:
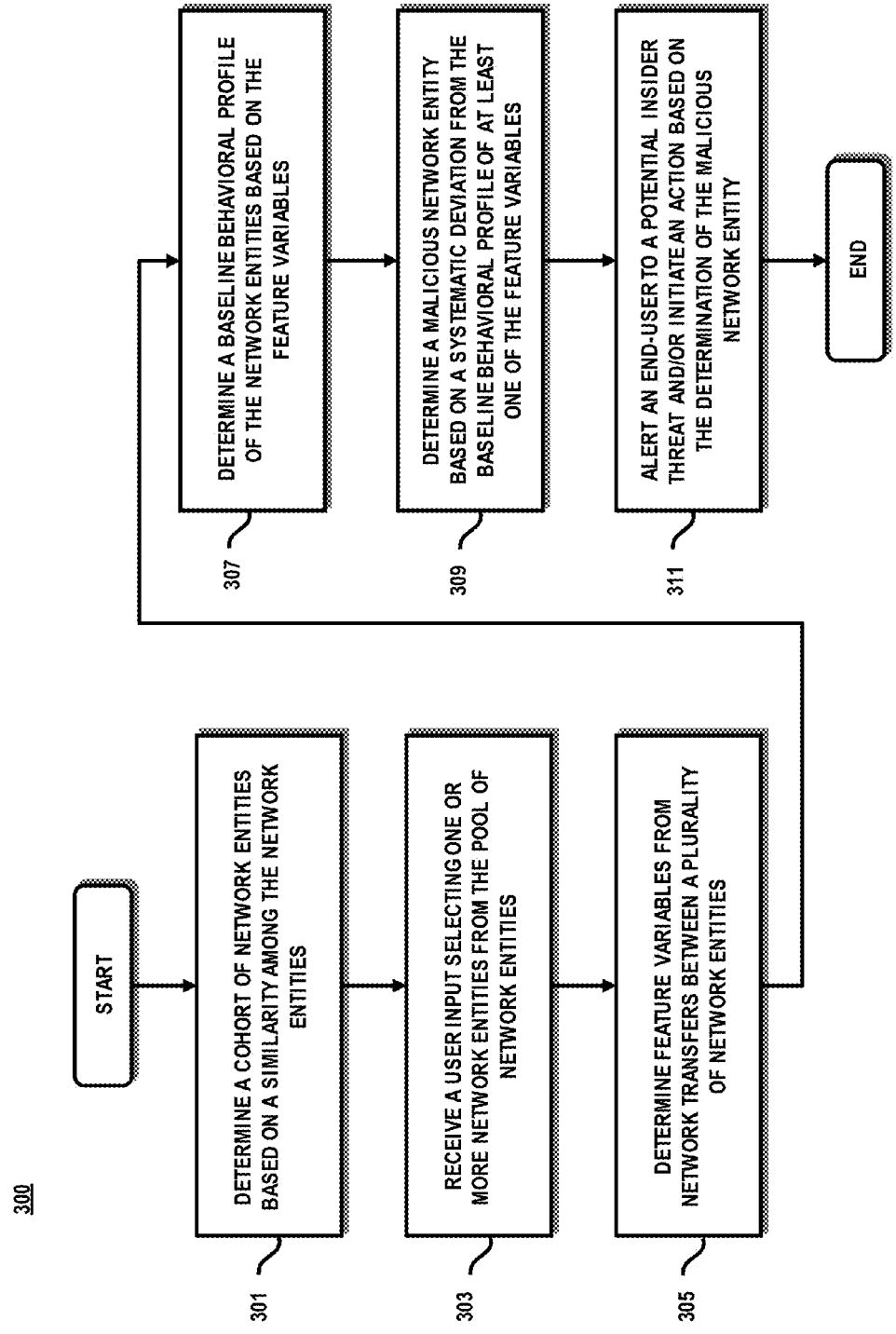
FIGS. 3A through 3C illustrate flowcharts of various processes for insider threat detection, according to an exemplary embodiment.
Figure 3B:
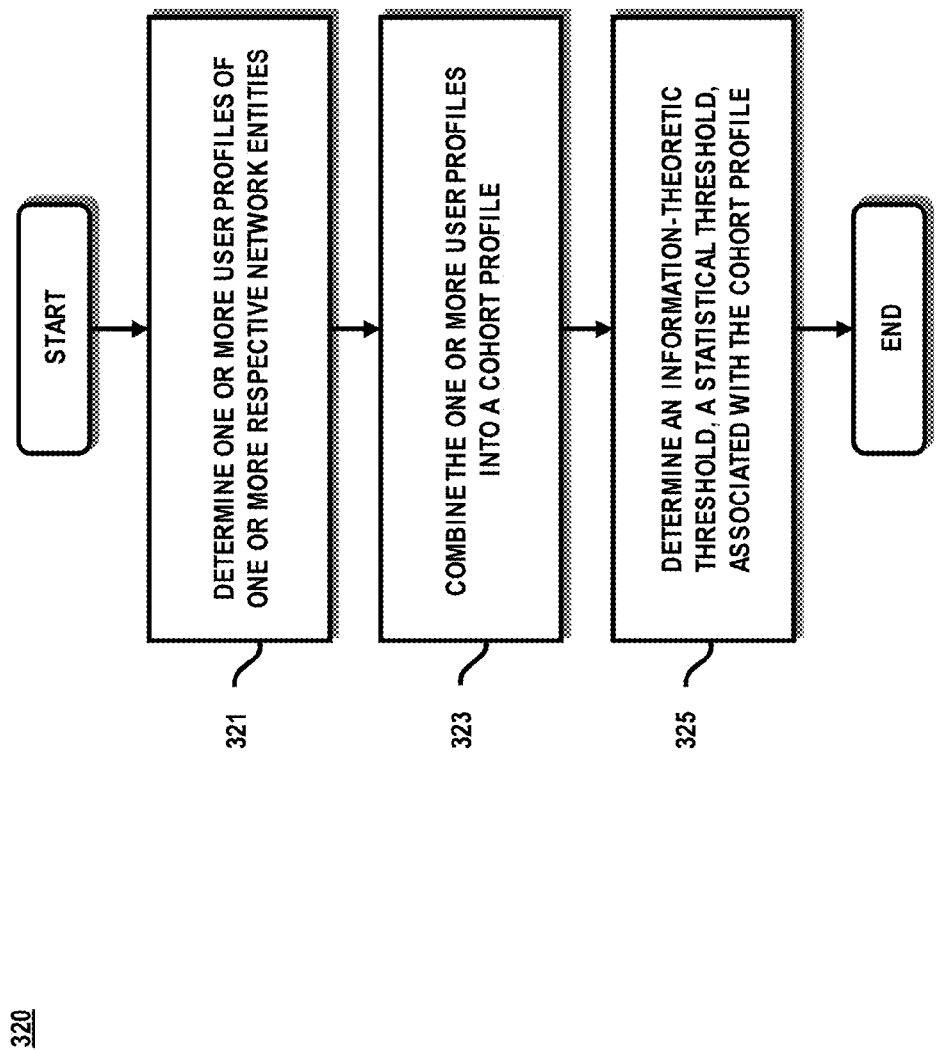
Figure 3C:
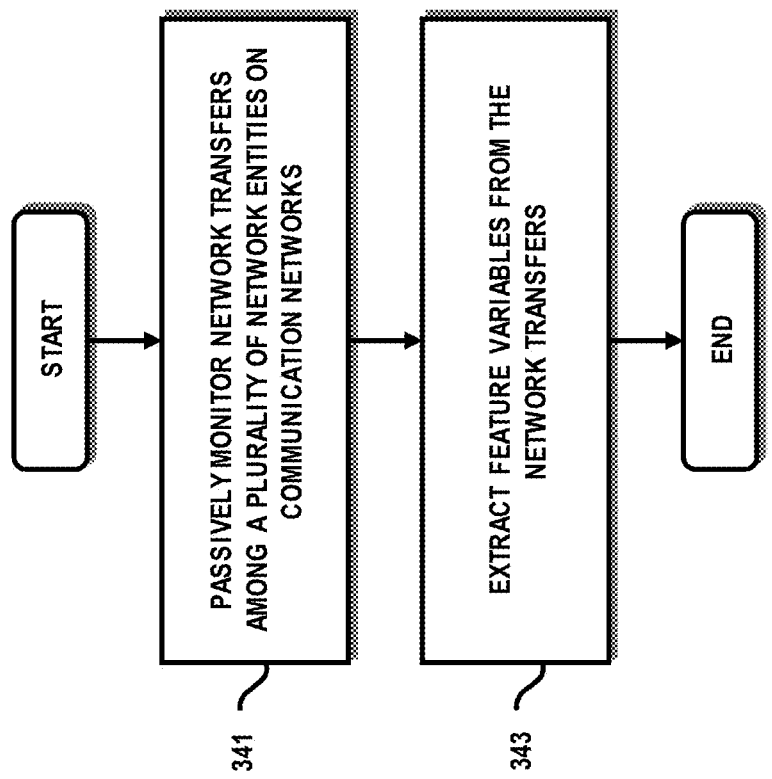
Figure 7:
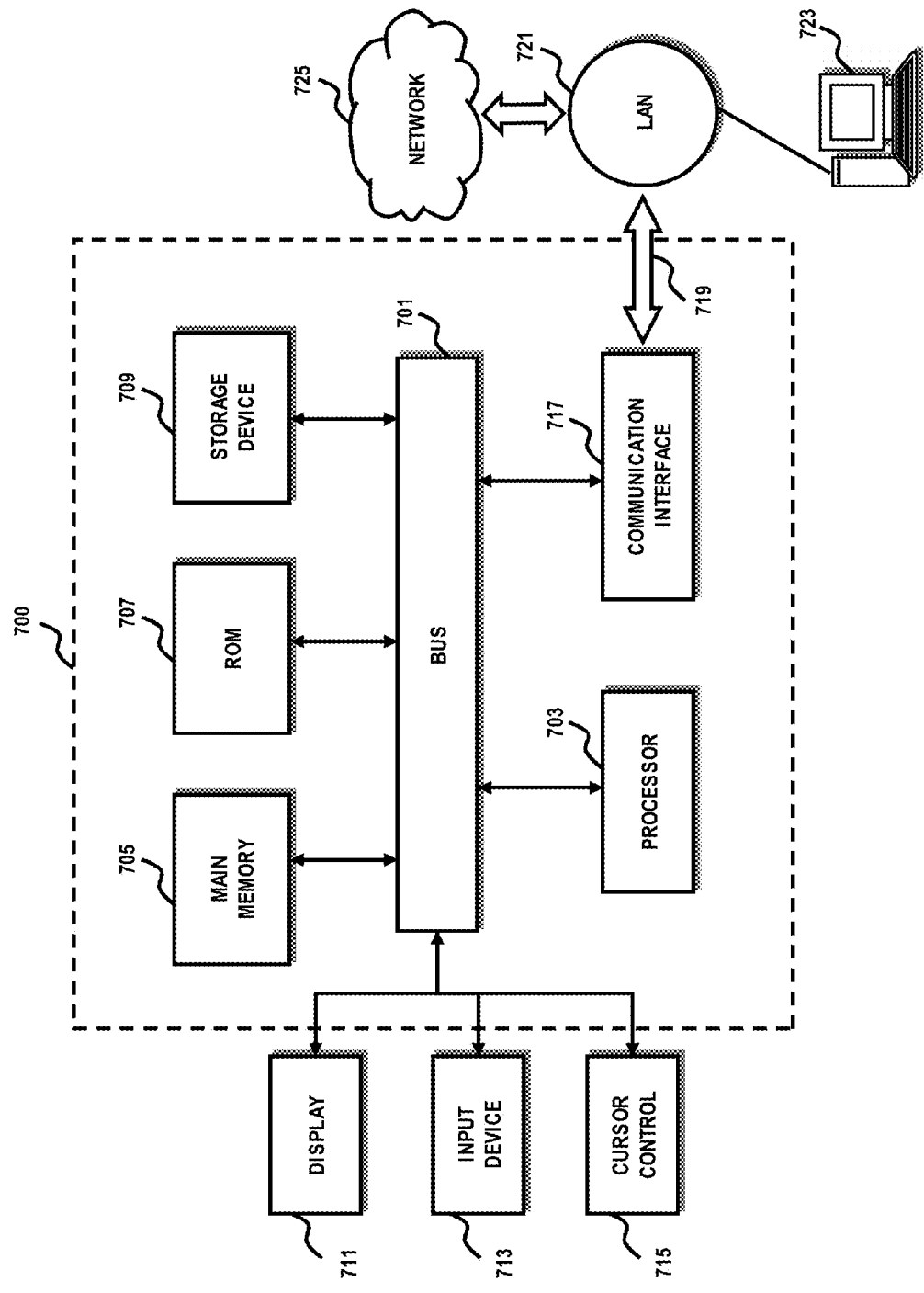
FIG. 7 is a diagram of a computer that can be used to implement various exemplary embodiments.

FIGS. 3A through 3C illustrate flowcharts for insider threat detection, according to an exemplary embodiment. In one embodiment, threat detection platform 115 performs the processes illustrated in FIGS. 3A through 3C and are implemented in, for instance, a computer system including a processor and a memory as shown in FIG. 7.

FIG. 3A is a flowchart of a process 300 for insider threat detection, according to one embodiment. It is noted that the steps of process 300 may be performed in any suitable order, as well as combined or separated in any suitable manner. For purposes of illustration, the steps of process 300 are described in relation to FIG. 2A.

In step 301, a cohort of insiders is determined based on a similarity among the insiders. In one embodiment, profile module 205 may determine a similarity among various insiders based on user information, including title, location, department/division, etc. Thus, various users or other network entities may be grouped based on the similarity of their roles or functions within an organization, their level of access to proprietary information, etc. In one embodiment, threat detection platform 115 may suggest various cohorts of insiders for the purpose of conducting a threat analysis with respect to those cohorts. In one embodiment, an end-user may select a suggested cohort and initiate a threat analysis. In step 303, one or more insiders may be selected from the cohort of insiders based on a user input. For instance, an end-user may select users by querying or searching for individuals assigned to specific locations or roles within an organization. It is contemplated that the target of a threat analysis may be flexibly determined by an end-user based on any perceived security concerns. In one embodiment, step 303 may be optionally skipped and the threat analysis may be conducted with respect to the entire cohort of insiders determined in step 301.

In step 305, one or more features are determined from one or more network transfers between a plurality of network entities. In one embodiment, feature vector module 203 of platform 115 may dynamically monitor traffic on a network, parse packet header information, and extract relevant header information for storage in a feature vector. Alternatively, it is contemplated that feature vector module 203 may separately record the extracted features for each packet for later analysis. In one embodiment, feature vector module 203 may also identify a user account of the insider that sent the traffic. For example, the sender may be identified as an insider based on a known association of network credentials or IP addresses with particular users. In one embodiment, feature vector module 203 may track packets belonging to the same communication session. That is, packets sharing the same sender/destination addresses, port numbers, and/or other session identifiers, may be tracked by a single feature vector. For instance, a volume coordinate of the feature vector may represent a cumulative volume of all packets belonging to a single network transfer.

In step 307, a baseline behavioral profile of one or more insiders is determined based on the extracted features. In one embodiment, profile module 205 aggregates the features of a subset of users on network 103 to develop the baseline behavioral profile with respect to these users. For instance, a baseline behavioral profile may be determined from an instance count and instance volume distribution, as described in relation to FIGS. 2E and 2F, respectively. In one embodiment, profile module 205 may dynamically learn a baseline behavioral profile while live network traffic is being monitored by feature vector module 203. In one embodiment, the baseline behavioral profile is represented by an aggregate of one or more features extracted from the monitored traffic. Profile module 205 may employ a moving window with respect to incoming data and only utilize the most recent data to update the baseline behavioral profile.

In step 309, at least one malicious insider from the one or more insiders is determined based on a systematic deviation from the baseline behavioral profile of at least one of the features. In one embodiment, anomaly detection module 211 analyzes the frequency, volume, and various characteristics of communication sessions initiated by a particular insider to determine that the insider is a malicious insider. For example, the instance volume and instance count coordinates of feature vectors generated from observed network events may be compared to various threshold values that are based on the baseline behavioral profile determined in step 307. This comparison may be used to determine that one or more uploads or downloads are anomalous with respect to the determined baseline behavioral profile. For instance, the threshold values may be exceeded by an anomalous instance coordinate, thus indicating systematic and non-conformist network transfers and, therefore, a potential exfiltration or collection of sensitive information. As further described in relation to FIG. 3B, the threshold values may be based on an information-theoretic and/or statistical thresholds.

In step 307, an end-user is alerted to a potential insider threat based on the determination of the at least one malicious insider. For instance, threat detection platform 115 may notify an IT security analyst, network administrator, or IT manager within an organization of the network credentials or other identification information of the malicious insider. Alternatively, a report of suspicious activity may be sent to the end-user, but only including anonymized personal identifying information to protect the identity of the insider until the user is adjudicated by the end-user as a malicious insider. In one embodiment, alert module 213 may automatically generate a report of suspicious activity based on the results of anomaly detection module 211. The report may include the specific time, location, and type of network transfer that triggered the alert along with detailed information on the systematic deviation of the transfers from a baseline behavioral profile. The notification may be transmitted by e-mail, SMS, NMS, IP, instant messaging, voice sessions, or other forms of electronic communication.

FIG. 3B is a flowchart of a process 320 for determining a baseline behavioral profile, according to one embodiment. It is noted that the steps of process 320 may be performed in any suitable order, as well as combined or separated in any suitable manner. For illustration, the steps of process 320 are described in relation to FIG. 2A.

In step 321, profile module 205 determines user profiles of one or more insiders. In one embodiment, profile module 205 generates a user profile by sorting or aggregating feature vectors associated with particular users or other network entities. All network transfers initiated by each insider may be further sorted according to an instance count or an instance volume. In step 323, the user profiles are combined into a cohort profile. In one embodiment, profile module 205 determines the cohort profile by aggregating feature vectors associated with different users or other network entities. As described above in relation to FIG. 3A, the set of insiders for which the cohort profile is determined may be selected from a cohort of insiders assigned to one or more similarly levels. For instance, the insiders may all belong to the same workgroup or department of an organization. It is contemplated that an operator (e.g., a security analyst) may select the insiders that it desires to be part of the cohort profile.

In step 325, an information-theoretic and statistical threshold associated with the baseline behavioral profile are determined. In one embodiment, threshold module 209 determines the information-theoretic threshold as an entropy value that indicates the likelihood that more than one insider is associated with a certain feature vector. In one embodiment, the statistical threshold is a percentile value based on a cumulative volume distribution of all network transfers observed within a fixed interval. In one embodiment, a systematic deviation from the baseline behavioral profile is observed if the information-theoretic threshold and the statistical threshold are simultaneously satisfied (e.g., as illustrated with respect to scatterplot 280 in FIG. 2H).

FIG. 3C is a flowchart of a process 340 for determining features from network transfers between a plurality of network entities, according to one embodiment. It is noted that the steps of process 340 may be performed in any suitable order, as well as combined or separated in any suitable manner. For illustration, the steps of process 340 are described in relation to FIGS. 1A and 4.

In step 341, one or more communication networks are passively monitored for one or more network transfers between the plurality of network entities. In one embodiment, an inline monitoring system may be implemented on a communication network to observe all network communications. For example, a network switch may have one or more ports connected to a sensor module configured to monitor ports at the switch by mirroring inbound and outbound traffic. It is contemplated that such passive monitoring capability may be implemented on various network devices on one or more communication networks to passively monitor all offices of an organization. It is further contemplated that the organization may have offices in different geographic locations, including international offices in countries other than the one where threat detection platform 115 is located.

In step 343, features are extracted from the network transfers. In one embodiment, feature vector module 203 parses the contents of one or more captured packets and copies them to profile log 117. For example, features may be extracted for processing by profile module 205 and clustering module 207. It is contemplated that the features may be continually extracted and processed in real-time as traffic is collected. As discussed above, feature vector module 203 may track packets belonging to the same communication session. For instance, feature vector module 203 may associate packets sharing the same sender/destination addresses, port numbers, and/or other session identifiers, with a single feature vector.

Figure 4:
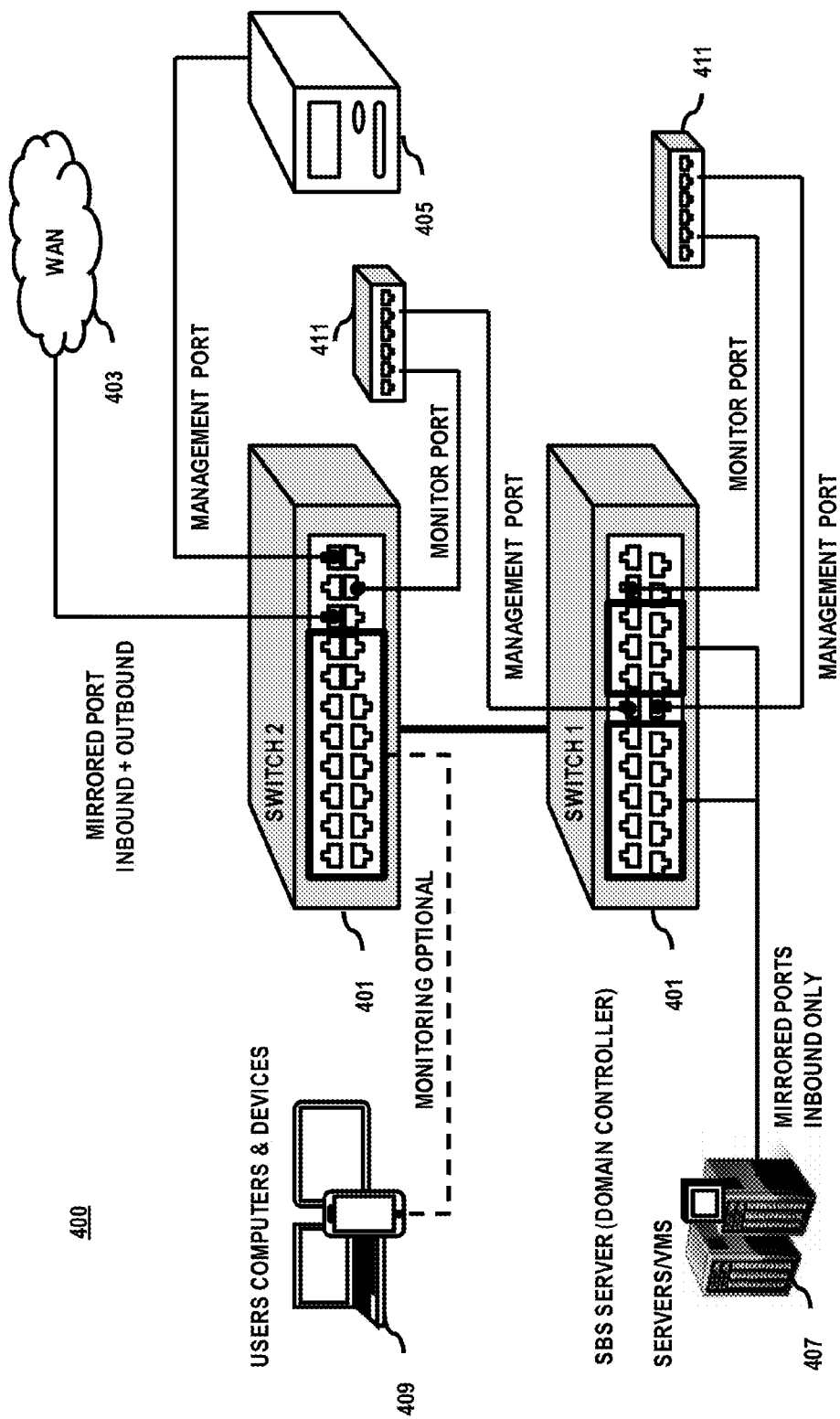
FIG. 4 is a diagram of a computer network capable of detecting an insider threat, according to an exemplary embodiment.

FIG. 4 is a diagram of a computer network capable of detecting behavior of an insider, according to one embodiment. As shown, computer network 400 includes switches 401, WAN (e.g., the Internet) 403, insider threat detector 405 (e.g., threat detection platform 115), servers 407 (e.g., server device 113), computing devices 409 (mobile device 111), and sensor modules 411. Sensor modules 411 are configured to monitor ports at switches 401, for instance, by connecting to a mirrored port of switches 401 for inbound and outbound traffic to WAN 403, at computing devices 409, and servers 407. Insider threat detector 405 may then process the information monitored by the sensors as described above to detect an insider threat.

Figure 5:
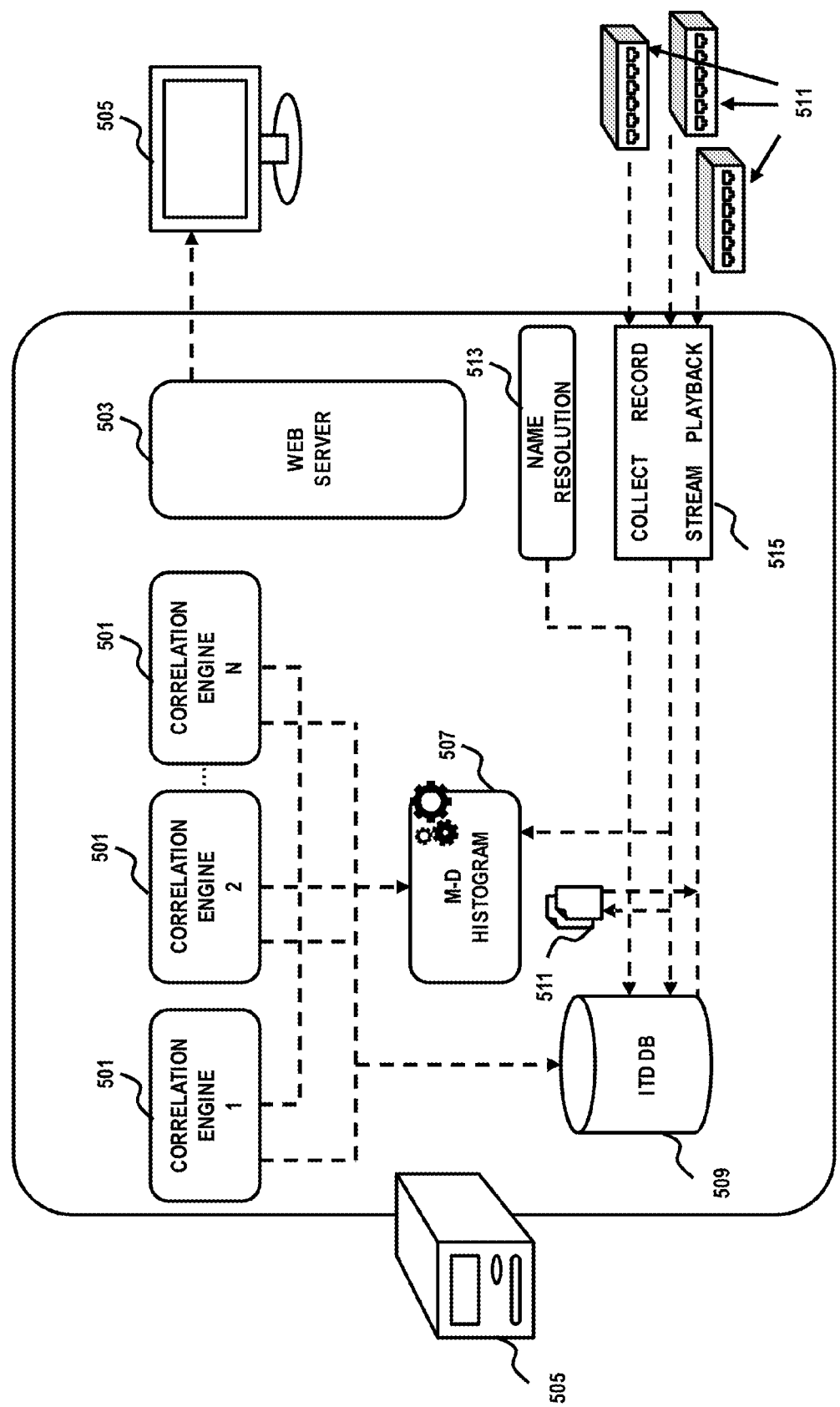
FIG. 5 is a diagram of the components of an insider threat detector, according to an exemplary embodiment.

FIG. 5 is a diagram of the components of insider threat detector 405, according to one embodiment. As shown, insider threat detector 405 includes correlation engines 501, web server 503 to connect to web portal 505 (e.g., portal 119), multi-dimensional (M-D) histogram 507, insider threat detection database (ITD DB) 509, log 511, name resolution module 513, a collection, record, stream, and playback module 515 connected to sensor modules 511. M-D histogram 507 may include feature vector module 203 and/or correlation engines 501 may include profile module 205, clustering module 207, threshold module 209, anomaly detection module 211, controller 201, and alert module 213.

Although FIG. 5 illustrates a plurality of sensor modules 511, some embodiments may only monitor web traffic, and thus sensor modules 511 may be omitted. Furthermore, sensor modules 511 may be deployed to monitor desktop, file servers, application servers, and the like to allow for additional coverage. It is contemplated that a number of deployed sensor modules 511 may also depend on a desired level of coverage, an organization of a network, and specifications of network components.

Furthermore, once installed, insider threat detector 405 may be configured according to end-user requirements and an organization's security policies. Such requirements may be adjusted to allow a more conservative or aggressive level of monitoring and alerts. The security policies may be configured to dictate where alerts are sent when generated. For instance, end-users may request that all alerts go to one or more of a system administrator, a chief information officer (CIO), a chief information security officer (CISO), and the like.

Additionally, insider threat detector 405 may utilize a calibration phase to establish a baseline behavioral profile throughout an organization or network (e.g., network 400). The baseline behavioral profile may be created by aggregating user profiles of the insiders in the organization. To expedite the calibration phase, for instance, insider threat detector 405 may utilize a heightened generation of alerts as initial data points are collected and sorted into groups. It is noted that information may be quickly adjudicated to resolve unexpected issues during the calibration phase, including back-office servers and network components that may be misconfigured or under repair.

Correlation engines 501 may perform clustering and/or anomaly detection. Such clustering may be done utilizing a statistical distance function with respect to any feature variable and any group of insiders. It is contemplated that a selection of the distance function may be carefully made to allow for meaningful hierarchical clusters. Anomaly detection is implemented, for example, by building an empirical distribution for each cluster, then applying non-parametric hypothesis testing to identify outlier network sessions based on threshold values corresponding to a percentile value of the empirical distribution. Such a process may generate alerts when the threshold values are satisfied, and additionally may store information for an end-user (e.g., administrator, IT security analyst) to investigate and/or adjudicate the anomaly. As shown, multiple correlation engines 501 may be executed concurrently. In one embodiment, each of the correlation engines 501 is looking at behaviors on a network from a different perspective than the other correlation engines. For example, one of engines 501 assesses insider behavior by constructing feature vectors for each user account, while another engine 501 assesses insider behavior by constructing feature vectors for each IP address. It is contemplated that such an embodiment may enable overlapping coverage to protect against a scenario where an insider attempts to spread their activity across multiple devices (e.g., computing devices 409), or in an environment where multiple users share a computer or network enabled device (e.g., computing devices 409).

Web server 503 may include one or more of a situational awareness monitor, an alert screen, and an anomaly detail & forensics toolkit. There may also be a dashboard landing page that provides summaries from the entire system and health and status monitors of equipment (e.g., web portal 505) and processes (e.g., FIGS. 3A and 3B). The situation awareness monitor may provide a sweeping view into the ongoing activity across a computer network (e.g., network 400). In one embodiment, the monitor includes a dynamic graphic showing how each insider fits within an organization based on one or more behavior profiles. For instance, insiders with the most similar behaviors are placed together forming cohesive groups. The monitor may include real-time visualization that labels ongoing activity for each insider and group or cohort, including internal and external file transfers, chat sessions, web access, streaming videos, and the like. Accordingly, such visualization tools may help to bring suspicious activity (e.g., an insider threat) to the attention of an end-user.

Furthermore, web server 503 may include a list of past and current alerts (e.g., potential insider threats) on an alert screen. The alert screen may optionally include a source and severity of an alert provided in a summary view. In some embodiments, the alert screen may be configured to allow an end-user to indicate (e.g., adjudicate) an alert as being benign, suspicious, or threatening.

Web server 503 may include an anomaly detail and forensics toolkit that is accessible to the situational awareness monitor and/or the alert screen. The toolkit may be configured to allow an end-user to view details (e.g., dig deeper) of a user' profile and/or baseline profile and why an activity (e.g., current activity) is identified as anomalous and potentially threatening. In one embodiment, a summary statistics is provided by web server 503 to allow an end-user to review each individual network session used in the evaluation.

M-D histogram 507 collects and collates session history as feature vectors, for instance, from all of the sensors and for users or other network entities across the network. Histogram 507 may act as a basis for building empirical distributions and statistical hypothesis testing for learning baseline behavior and/or detecting insider threats. In one embodiment, histogram 507 utilizes efficient in-memory storage of data, thereby enabling a system to maintain a large number (e.g., billions) of feature vectors for fast querying by correlation engines 501. In one embodiment, histogram 507 may be distributed across different geographic locations. For instance, histogram 507 may collect and collate feature vectors associated with insiders at a US office with those of insiders at a European office of the same organization. Thus, correlation engines 501 may track user activities globally such that their specific location is transparent to the end-user. In one embodiment, a baseline behavioral profile may be created as a global profile (across all monitored locations) or as a profile specific to a single network entity's activities at a specific location.

Name resolution module 513 may integrate with a host's active directory services so that user account information can be obtained in real-time, and a web server is installed to provide an end-user interface to the application.

Collection, record, stream, and playback module 515 may store forensic and configuration information, maintain mappings for IP addresses to domain names, and may maintain mappings for user accounts to computer hostname in a log (e.g., ITD DB 509). Raw data feeds from sensors (e.g., sensors 411) may be also persisted to provide additional forensic information and/or to provide a playback capability.

FIG. 6 illustrates an anomaly detection algorithm, according to an exemplary embodiment. In one embodiment, the DetectAnomalies procedure is called. The input is cluster C, member target T, a concentration threshold concThresh ([0-1]), and a volumetric threshold volThresh ([0-1]). The output is A, a set of anomalous feature vectors as represented by instance coordinates. Line 1.3 computes the volumetric index associated with volThresh, as shown in FIG. 2G. In one embodiment, the volumetric index is computed by adapting Equation (6) to return an index value rather than the cumulative probability. Next, all the instance coordinates are iteratively evaluated in lines 1.4-1.8 against both the volume and concentration threshold values supplied to the procedure. If an instance coordinate simultaneously satisfies both thresholds, it is added to the set A. The sub-procedure Entropy (line 1.5) implements Equation (7), according to an exemplary embodiment. The variable maxIndex (lines 2.2 and 2.9) is the largest volumetric index representing a data transfer. Under most practical network conditions, it has a value no greater than 50 (equivalent to 1.2 petabytes if evaluated as an exponent of the base-2 bin spacing).

The processes described herein for detecting insider threats may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 7 is a diagram of a computer system that can be used to implement various exemplary embodiments. Computer system 700 includes bus 701 or other communication mechanism for communicating information and one or more processors (of which one is shown) 703 coupled to bus 701 for processing information. Computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by processor 703. Computer system 700 may further include read only memory (ROM) 707 or other static storage device coupled to bus 701 for storing static information and instructions for processor 703. Storage device 709, such as a magnetic disk, flash storage, or optical disk, is coupled to bus 701 for persistently storing information and instructions.

Computer system 700 may be coupled via bus 701 to display 711, such as a cathode ray tube (CRT), liquid crystal display, active matrix display, or plasma display, for displaying information to a computer user. Additional output mechanisms may include haptics, audio, video, etc. Input device 713, such as a keyboard including alphanumeric and other keys, is coupled to bus 701 for communicating information and command selections to processor 703. Another type of user input device is cursor control 715, such as a mouse, a trackball, touch screen, or cursor direction keys, for communicating direction information and command selections to processor 703 and for adjusting cursor movement on display 711.

According to an embodiment of the invention, the processes described herein are performed by computer system 700, in response to processor 703 executing an arrangement of instructions contained in main memory 705. Such instructions can be read into main memory 705 from another computer-readable medium, such as storage device 709. Execution of the arrangement of instructions contained in main memory 705 causes processor 703 to perform the process steps described herein. One or more processors in a multi-processing arrangement may also be employed to execute the instructions contained in main memory 705. In alternative embodiments, hard-wired circuitry may be used in place of or in combination with software instructions to implement embodiments of the invention. Thus, embodiments of the invention are not limited to any specific combination of hardware circuitry and software.

Computer system 700 also includes communication interface 717 coupled to bus 701. Communication interface 717 provides a two-way data communication coupling to a network link 719 connected to local network 721. For example, communication interface 717 may be a digital subscriber line (DSL) card or modem, an ISDN card, a cable modem, a telephone modem, or any other communication interface to provide a data communication connection to a corresponding type of communication line. As another example, communication interface 717 may be a LAN card (e.g. for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, communication interface 717 can include peripheral interface devices, such as a Universal Serial Bus (USB) interface, an IEEE 1394 (e.g., FireWire™) interface, a PCMCIA (Personal Computer Memory Card International Association) interface, etc. Although a single communication interface 717 is depicted in FIG. 7, multiple communication interfaces can also be employed.

Network link 719 typically provides data communication through one or more networks to other data devices. For example, network link 719 may provide a connection through local network 721 to a host computer 723, which has connectivity to network 725 (e.g. a WAN or a global packet data communication network such as the Internet) or to data equipment operated by a service provider. Local network 721 and network 725 both use electrical, electromagnetic, or optical signals to convey information and instructions. The signals through the various networks and the signals on network link 719 and through communication interface 717, which communicate digital data with computer system 700, are exemplary forms of carrier waves bearing the information and instructions.

Computer system 700 can send messages and receive data, including program code, through the network(s), network link 719, and communication interface 717. In the Internet example, a server (not shown) might transmit requested code belonging to an application program for implementing an embodiment of the invention through network 725, local network 721 and communication interface 717. Processor 703 may execute the transmitted code while being received and/or store the code in the storage device 709, or other non-volatile storage for later execution. In this manner, computer system 700 may obtain application code in the form of a carrier wave.

The term "computer-readable medium" as used herein refers to any medium that participates in providing instructions to processor 703 for execution. Such a medium may take many forms, including but not limited to computer-readable storage medium ((or non-transitory)—e.g., non-volatile media and volatile media), and transmission media. Non-volatile media include, for example, optical or magnetic disks, such as storage device 709. Volatile media include dynamic memory, such as main memory 705. Transmission media include coaxial cables, copper wire and fiber optics, including the wires that comprise bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:

determining, by a processor of a threat detection platform, one or more features from one or more network transfers of one or more communication packets between a plurality of network entities, wherein the plurality of network entities include an authorized user and/or authorized device of a private communication network, and wherein the one or more features include a volume of the one or more network transfers between a first network entity and a second network entity of the plurality of network entities, a time interval associated with the one or more network transfers, a direction of the one or more network transfers, or a combination thereof;

determining, by the processor, a baseline behavioral profile of one or more of the plurality of network entities based on the one or more features determined during a time period;

determining a systematic deviation from the baseline behavioral profile of at least one of the one or more features by one or more of the plurality of network entities by comparing the baseline behavioral profile with the one or more features determined outside of the time period; and determining, by the processor, at least one malicious network entity from among the plurality of network entities based on a systematic deviation from the baseline behavioral profile of at least one of the one or more features.

2. A method of claim 1, further comprising:

determining at least one cohort of the plurality of network entities based on a similarity among the plurality of network entities, wherein the baseline behavioral profile, the at least one malicious network entity, or a combination thereof is determined with respect to the at least one cohort.

3. A method of claim 2, further comprising:

determining at least one cohort profile for the at least one cohort based on one or more user profiles associated with the plurality of network entities that are respectively clustered in the at least one cohort; and determining an information-theoretic threshold, a statistical threshold, or a combination thereof associated with the at least one cohort profile, wherein the at least one cohort profile is designated as the baseline behavioral profile for the at least one cohort based on the information-theoretic threshold, the statistical threshold, or a combination thereof.

4. A method of claim 3, further comprising:

determining the at least one cohort profile by aggregating the at least one of the one or more features for the plurality of network entities.

5. A method of claim 1, wherein the baseline behavioral profile is updated in real-time.

6. A method of claim 1, wherein the determination of the baseline behavioral profile comprises:
   determining at least one clustering with respect to the plurality of network entities of an instance count, an instance volume, or a combination thereof, of the one or more network transfers.

7. A method of claim 1, wherein the at least one clustering is used to determine an information-theoretic threshold, a statistical threshold, or a combination thereof of the one or more network transfers with respect to the plurality of network entities.

8. A method of claim 1, wherein the systematic deviation from the baseline behavioral profile is observed when an information theoretic threshold and a statistical threshold are simultaneously satisfied by at least one of the one or more network transfers.

9. A method of claim 1, wherein the plurality of network entities are authorized users, authorized devices, or a combination thereof, and wherein the at least one malicious network entity is an authorized user, an authorized device, or a combination thereof accessing one or more secure assets for an unauthorized purpose.

10. A method of claim 1, wherein the determination of the one or more features comprises:
    passively monitoring the private communication network for the one or more network transfers; and
    extracting the one or more features from the one or more network transfers.

11. A method of claim 1, further comprising:
    initiating a presentation of an alert to indicate a potential insider threat, an action in response to the potential insider threat, or a combination thereof based on the determination of the at least one malicious network entity.

12. An apparatus comprising:
    at least one processor; and
    at least one non-transitory memory including computer program code for one or more programs, the at least one non-transitory memory and the computer program code configured to, with the at least one processor, cause the apparatus to perform the following,
        determine, by the processor, one or more features from one or more network transfers of communication packets between a plurality of network entities,
        wherein the plurality of network entities include an authorized user and/or authorized device of a private communication network, and
        wherein the one or more features include a volume of the one or more network transfers between a first network entity and a second network entity of the plurality of network entities, a time interval associated with the one or more network transfers, a direction of the one or more network transfers, or a combination thereof;
        determine, by the processor, a baseline behavioral profile one or more of the plurality of network entities based on the one or more features determined during a time period;
        determine a systematic deviation from the baseline behavioral profile by one or more of the plurality of network entities by comparing the baseline behavioral profile with the one or more features determined outside of the time period; and
        determine, by the processor, at least one malicious network entity from among the plurality of network entities if the at least one malicious network entity is associated with the systematic deviation from the baseline behavioral profile of at least one of the one or more features.

13. An apparatus of claim 12, wherein the apparatus is further caused to:
    determine at least one cohort of the plurality of network entities based on a similarity among the plurality of network entities,
    wherein the baseline behavioral profile, the at least one malicious network entity, or a combination thereof is determined with respect to the at least one cohort.

14. An apparatus of claim 13, wherein the apparatus is further caused to:
    determine at least one cohort profile for the at least one cohort based on one or more user profiles associated with the plurality of network entities that are respectively clustered in the at least one cohort; and
    determine an information-theoretic threshold, a statistical threshold, or a combination thereof associated with the at least one cohort profile,
    wherein the at least one cohort profile is designated as the baseline behavioral profile for the at least one cohort based on the information-theoretic threshold, the statistical threshold, or a combination thereof.

15. An apparatus of claim 14, wherein the apparatus is further caused to:
    determine the at least one cohort profile by aggregating the at least one of the one or more features for the plurality of network entities.

16. A system comprising:
    a plurality of network entities interconnected via a private communication network; and
    a threat detection platform, including a processor, configured to determine one or more features from one or more network transfers of one or more communication packets between a plurality of network entities, wherein the plurality of network entities include an authorized user and/or authorized device of a private network, and wherein the one or more features include a volume of the one or more network transfers between a first network entity and a second network entity of the plurality of network entities, a time interval associated with the one or more network transfers, a direction of the one or more network transfers, or a combination thereof; to determine a baseline behavioral profile of one or more of the plurality of network entities based on the one or more features determined during a time period; to determine a systematic deviation from the baseline behavioral profile by one or more of the plurality of network entities by comparing the baseline behavioral profile with the one or more features determined outside of the time period; and to determine at least one malicious network entity from among the plurality of network entities if the at least one malicious network entity is associated with the systematic deviation from the baseline behavioral profile of at least one of the one or more features.

17. A system of claim 16, wherein the threat detection platform is further configured to determine at least one cohort of the plurality of network entities based on a similarity among the plurality of network entities, and wherein the baseline behavioral profile, the at least one malicious network entity, or a combination thereof is determined with respect to the at least one cohort.

18. A system of claim 17, wherein the threat detection platform is further configured to determine at least one cohort profile for the at least one cohort based on one or more user profiles associated with the plurality of network entities that are respectively clustered in the at least one cohort, and to determine an information-theoretic threshold, a statistical threshold, or a combination thereof associated with the at least one cohort profile; and wherein the at least one cohort profile is designated as the baseline behavioral profile for the at least one cohort based on the information-theoretic threshold, the statistical threshold, or a combination thereof.

19. A method of claim 1, wherein the one or more features reflect data exfiltration or data collection of network traffic.

20. A method of claim 1, wherein the baseline behavioral profile is based on statistical or information-theoretic measure of network parameters extracted from network traffic.

* * * * *